(12) United States Patent
Hayashi

(10) Patent No.: US 7,957,026 B2
(45) Date of Patent: Jun. 7, 2011

(54) IMAGE TRANSMITTING APPARATUS, INCLUDING A READING CONDITION DETERMINING UNIT

(75) Inventor: Takahiko Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1039 days.

(21) Appl. No.: 11/681,929

(22) Filed: Mar. 5, 2007

(65) Prior Publication Data

US 2007/0211301 A1    Sep. 13, 2007

(30) Foreign Application Priority Data

Mar. 10, 2006    (JP) .................................. 2006-065103

(51) Int. Cl.
*G06F 15/00* (2006.01)
*H04N 1/04* (2006.01)

(52) U.S. Cl. ........................................ 358/1.6; 358/404

(58) Field of Classification Search ................. 358/1.13, 358/1.15, 400, 404, 448, 500, 474
See application file for complete search history.

(56) References Cited

U.S. PATENT DOCUMENTS

| 7,562,080 B2 * | 7/2009 | Koue et al. ............................ 1/1 |
| 2002/0157028 A1 * | 10/2002 | Koue et al. .................... 713/202 |
| 2005/0206968 A1 * | 9/2005 | Sodeura et al. ............... 358/474 |
| 2006/0012833 A1 * | 1/2006 | Ito et al. ........................ 358/400 |
| 2006/0039604 A1 * | 2/2006 | Fukawa et al. ................ 382/168 |

FOREIGN PATENT DOCUMENTS

| JP | 3621180 | 11/2004 |
| JP | 2005-12829 | 1/2005 |
| JP | 2006-93781 | 4/2006 |

OTHER PUBLICATIONS

U.S. Appl. No. 11/743,924, filed May 3, 2007, Hayashi.

* cited by examiner

*Primary Examiner* — Gabriel I Garcia
(74) *Attorney, Agent, or Firm* — Oblon, Spivak, McClelland, Maier & Neustadt, L.L.P.

(57) ABSTRACT

An image transmitting apparatus receives a first reading condition relating to an image from an external apparatus via a network. The image transmitting apparatus compares the first reading condition with a pre-set second reading condition, if the two conditions are different, decides one of the first reading condition and the second reading condition as a reading condition when selecting an image data to be transmitted to the external device. The image transmitting apparatus selects an image data that matches with the reading condition, and sends the selected image data to the external apparatus.

10 Claims, 18 Drawing Sheets

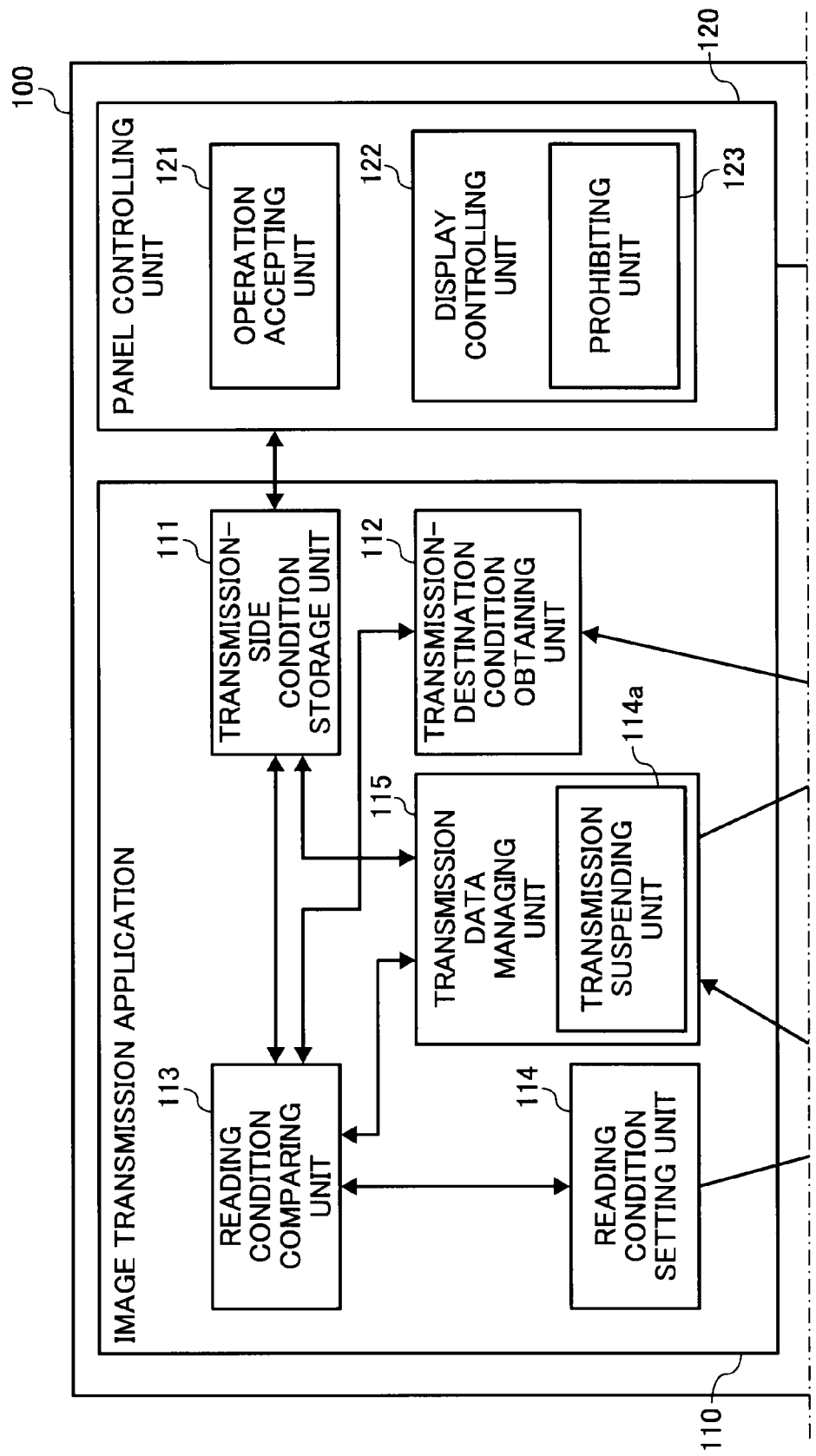

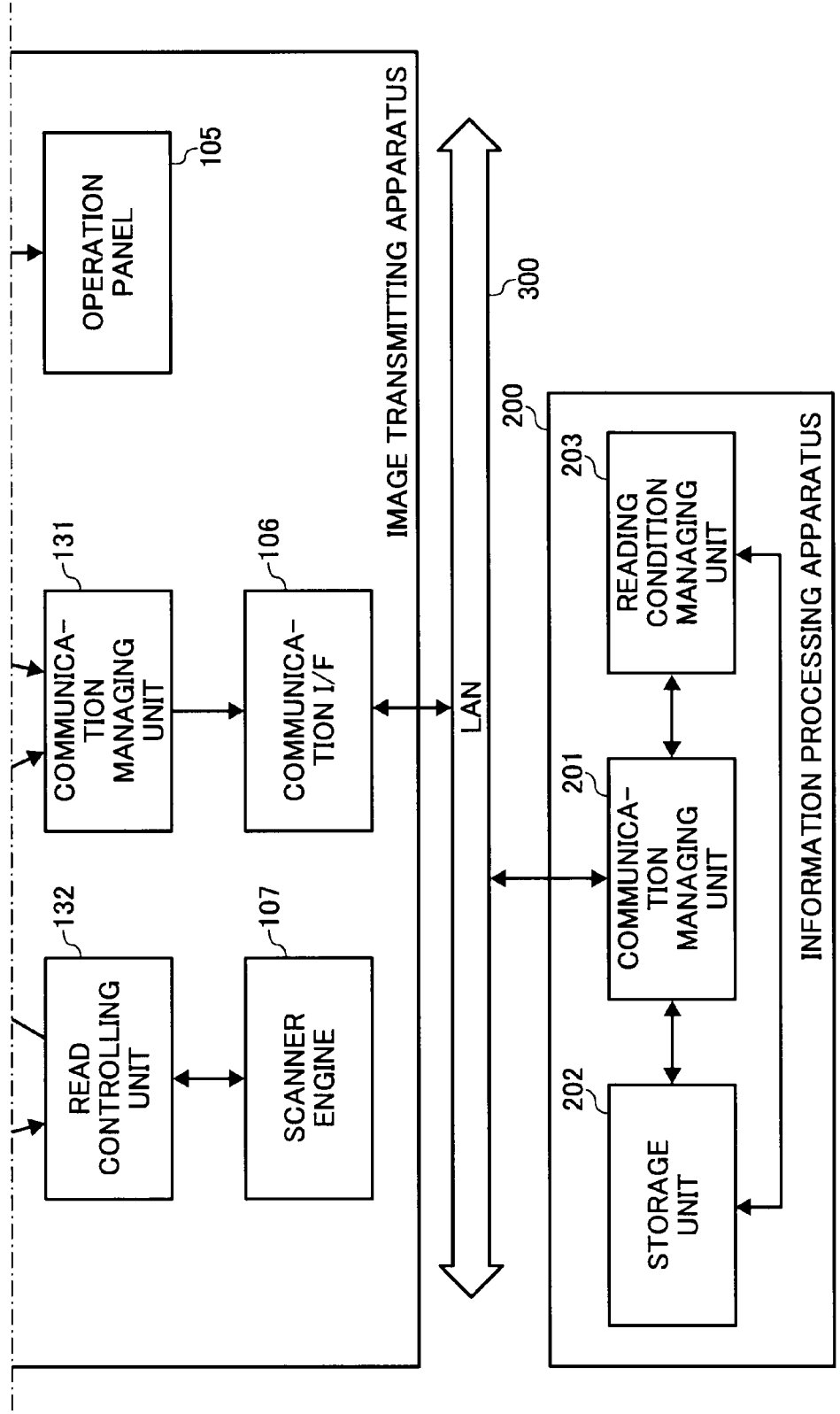

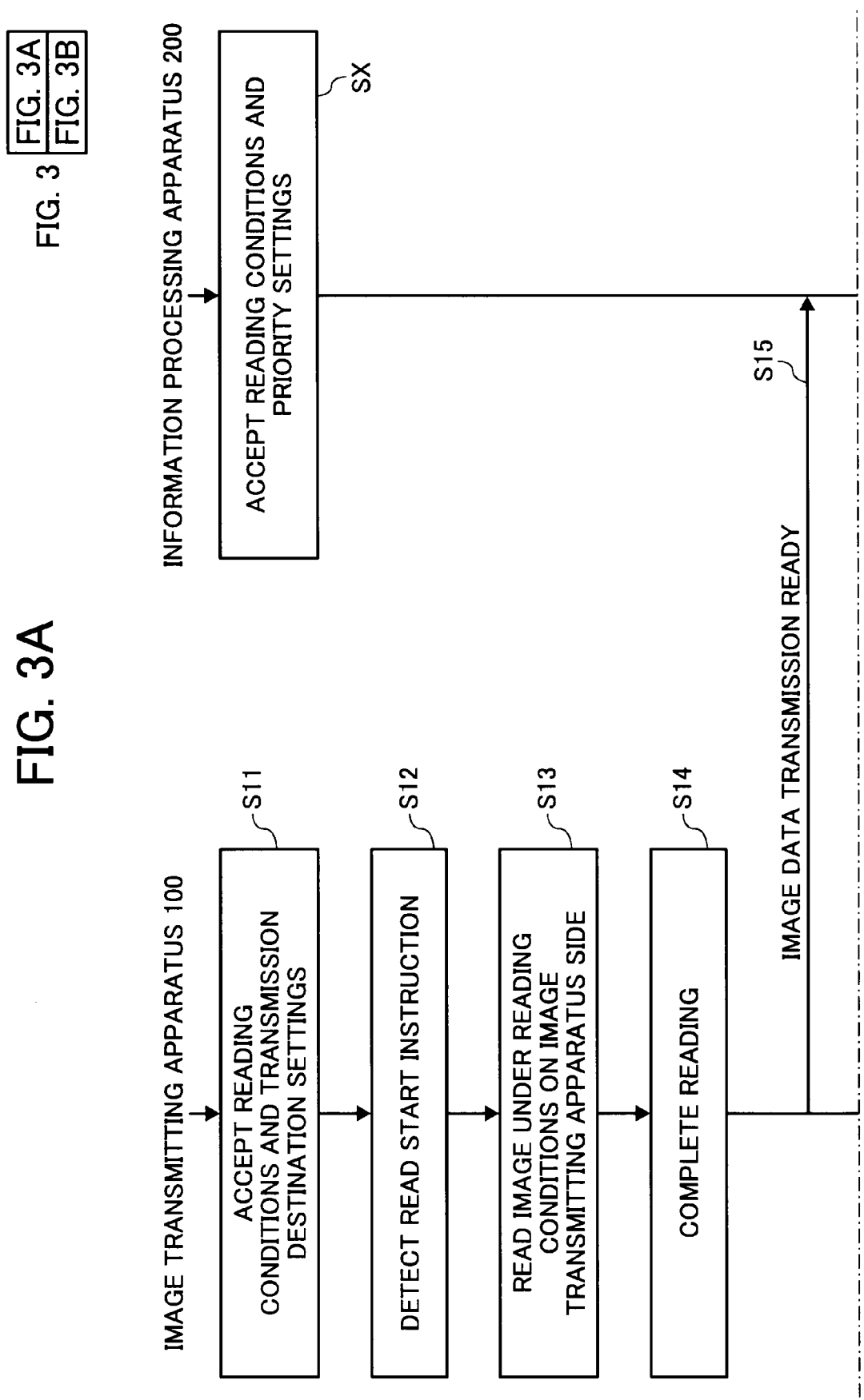

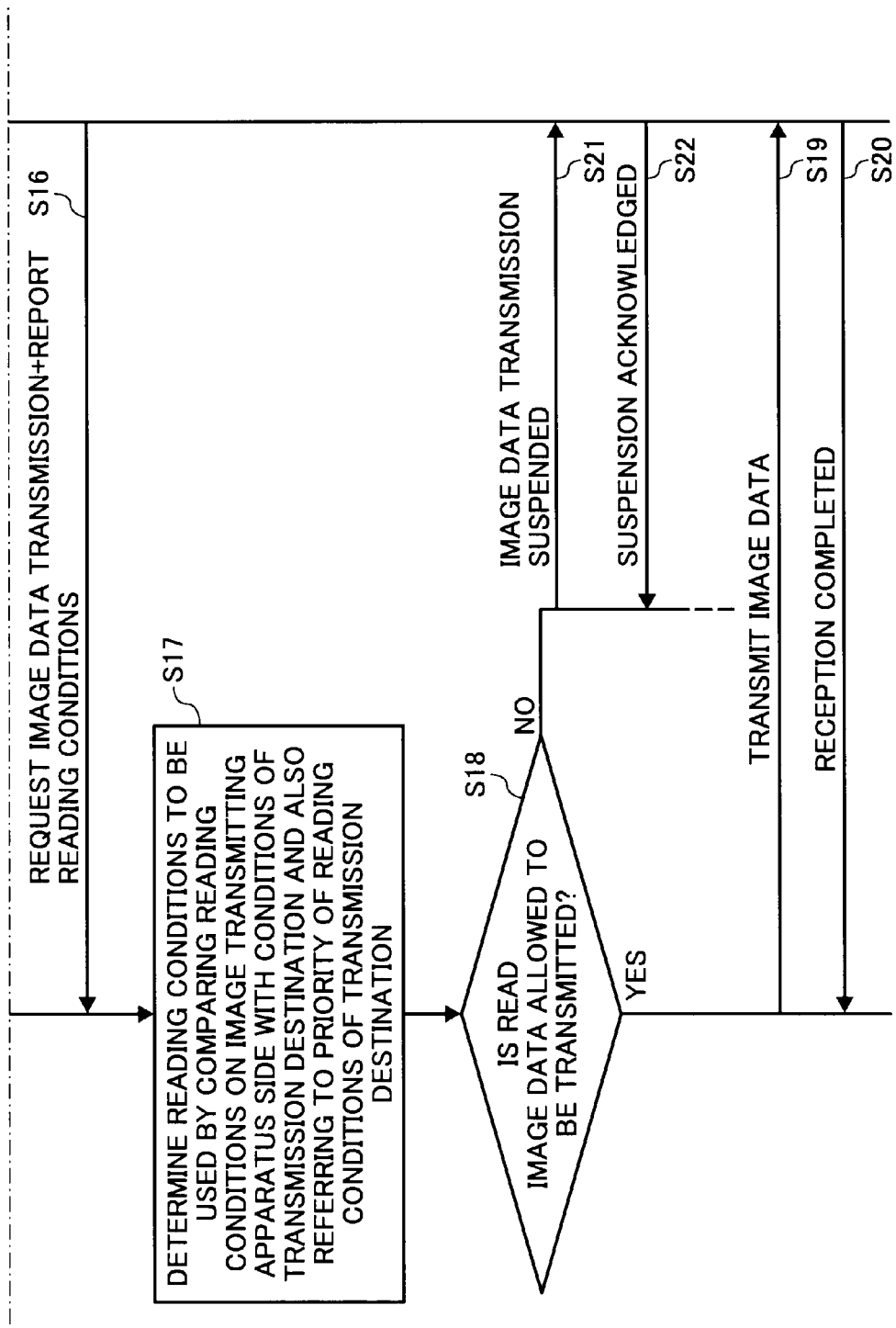

S16 → S101: WHAT IS PRIORITY OF READING CONDITIONS OF TRANSMISSION DESTINATION?

MUST → S103: CAUSE READING CONDITIONS OF TRANSMISSION DESTINATION TO BE DISPLAYED ON OPERATION PANEL

→ S104: DO READING CONDITIONS OF TRANSMISSION DESTINATION COINCIDE WITH READING CONDITIONS OF OWN APPARATUS?

YES → S105: CAUSE INDICATION TO BE DISPLAYED ON OPERATION PANEL, INDICATING THAT IMAGE DATA CAN BE TRANSMITTED ACCORDING TO READING CONDITIONS OF TRANSMISSION DESTINATION

NO →

WANT → S105

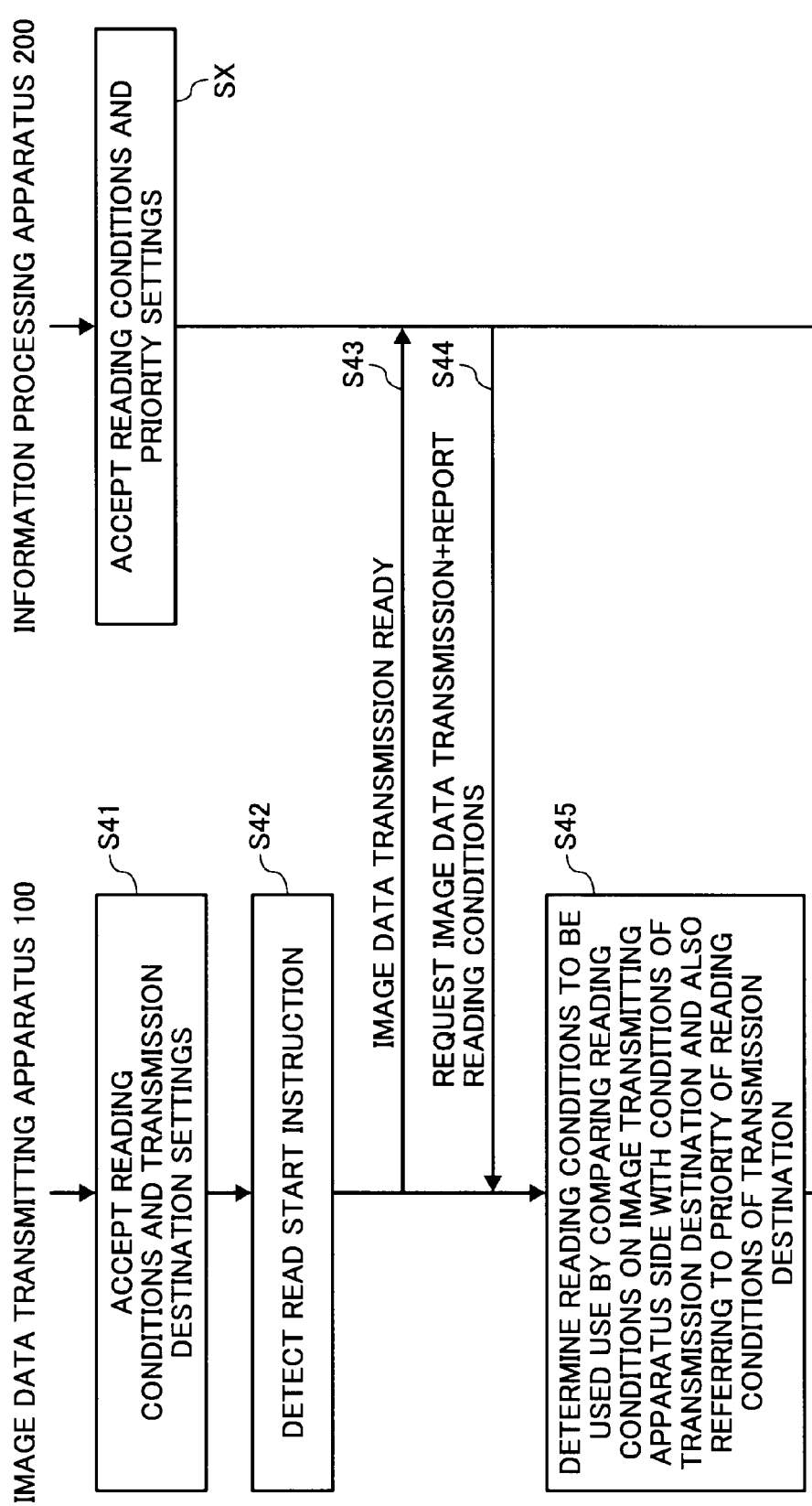

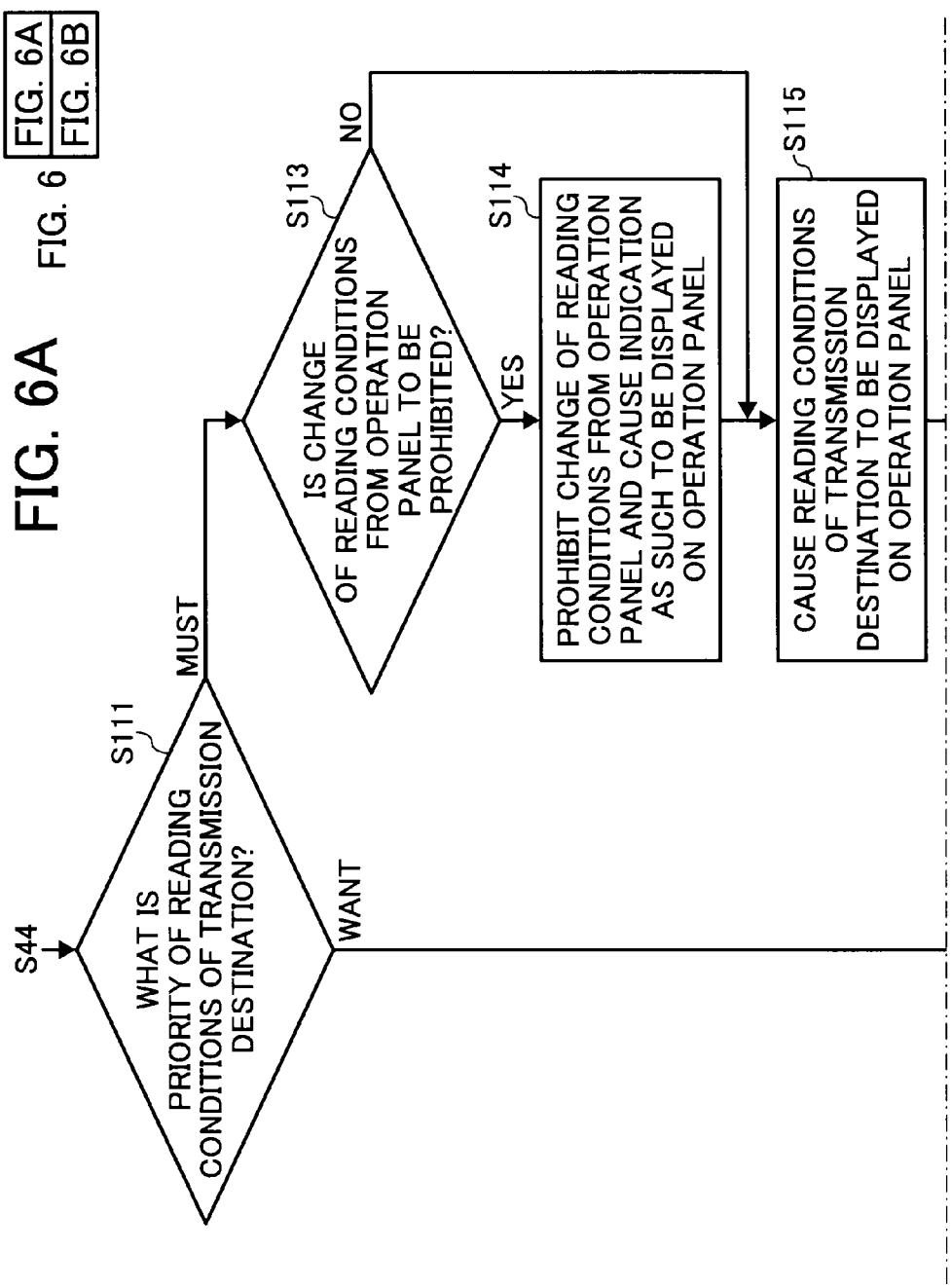

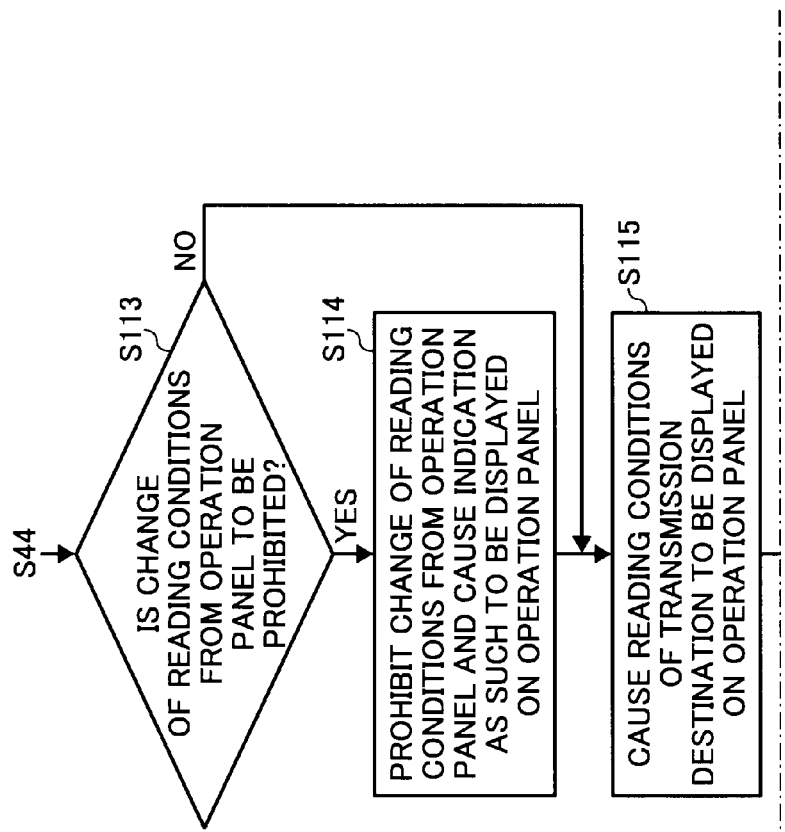

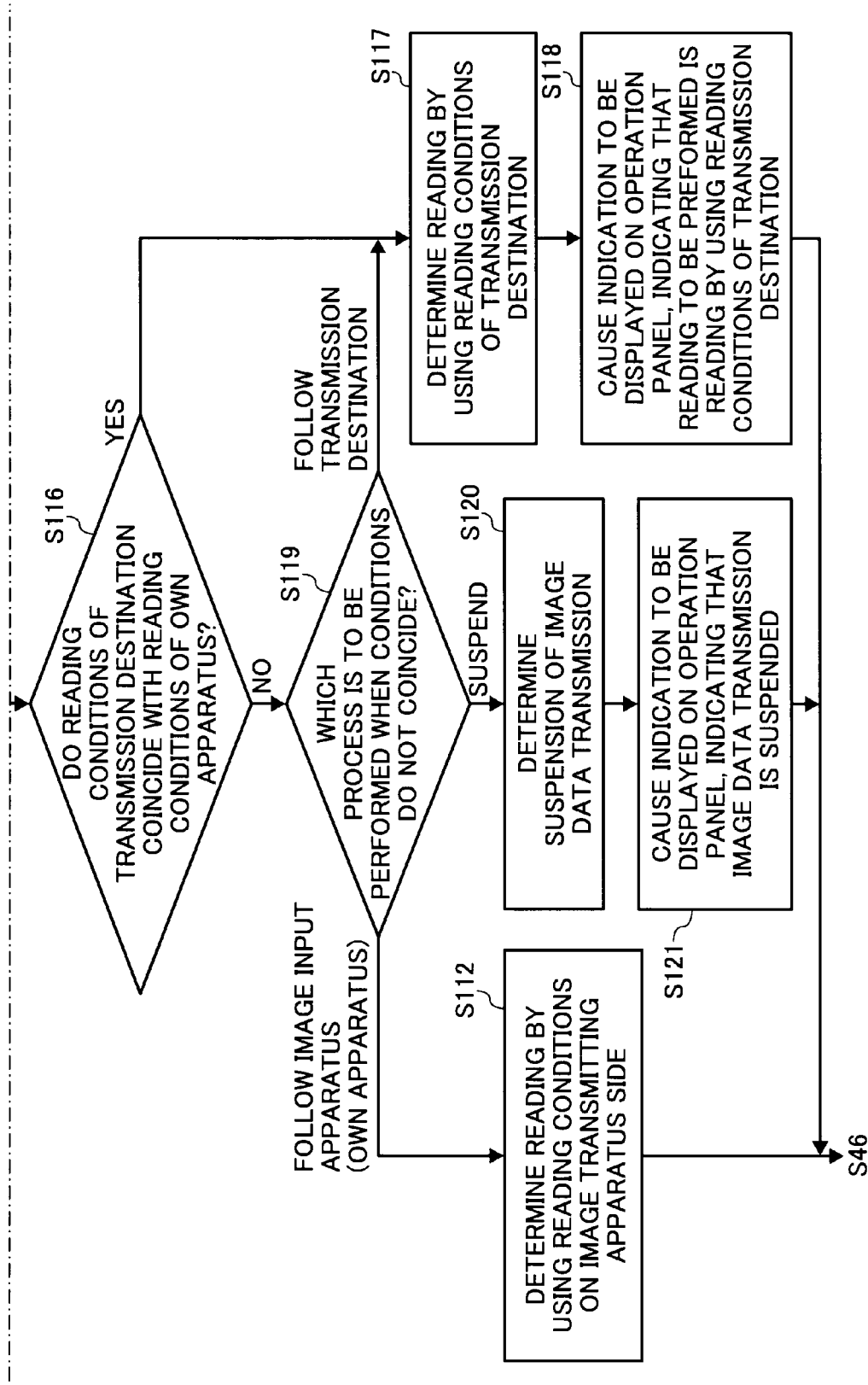

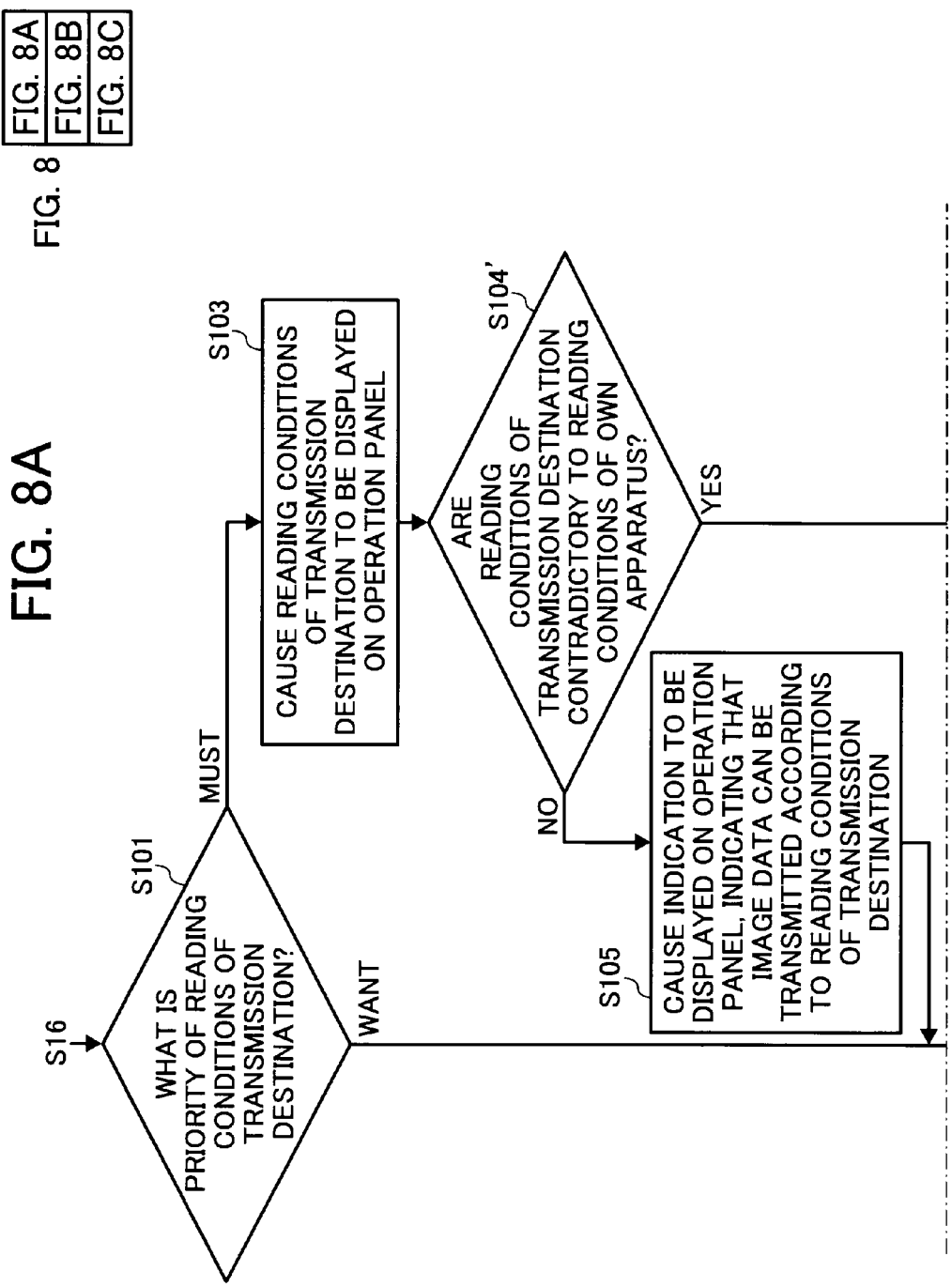

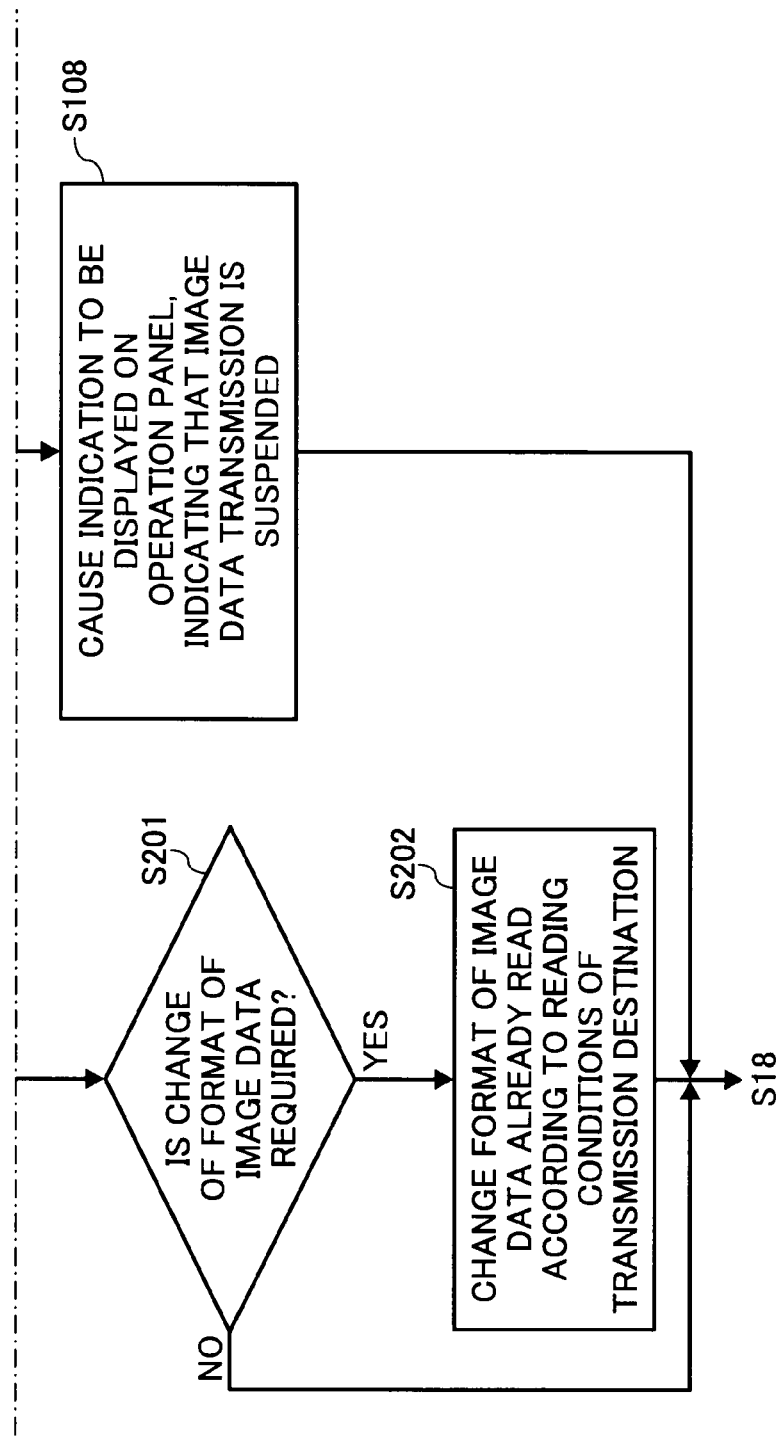

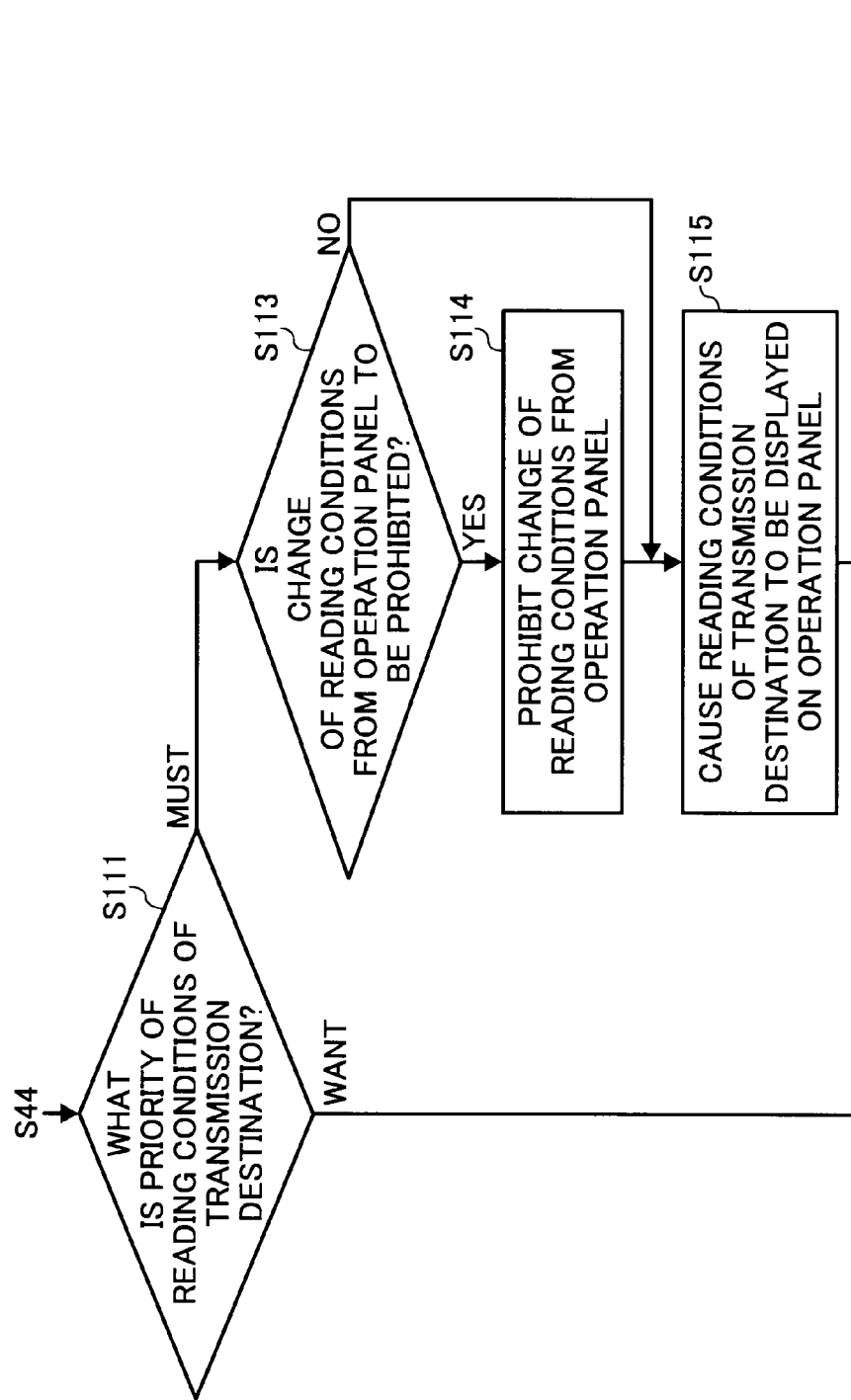

IMAGE TRANSMITTING APPARATUS, INCLUDING A READING CONDITION DETERMINING UNIT

CROSS-REFERENCE TO RELATED APPLICATIONS

The present document incorporates by reference the entire contents of Japanese priority document, 2006-065103 filed in Japan on Mar. 10, 2006.

BACKGROUND OF THE INVENTION

1. Field of the Invention

The present invention relates to an image transmitting apparatus that transmits image data to an external apparatus, image transmitting apparatus controlling method, and program product.

2. Description of the Related Art

Image transmitting apparatuses that transmit read image data to a communicable external apparatus through a network have been known.

A known example of such image transmitting apparatuses is a network scanner apparatus as disclosed in Japanese patent No. 3621180 (hereinafter, "first document"), in which scan conditions, such as a reading resolution, transmitted in advance from a client apparatus as an image transmission destination are stored for selection and, when a password set for each client terminal is entered, an image is read under the stored conditions and is transmitted to the client terminal.

The first document also discloses a network scanner apparatus including an operation panel that allows scan conditions and a client terminal as a transfer destination to be specified from a menu, thereby allowing transmission of an image read under the scan conditions specified through the operation panel to the transfer destination also specified through the operation panel.

Furthermore, a network scanner has been known as disclosed in Japanese Patent Application Laid-Open No. 2005-12829, in which a Tool Without An Interesting Name (TWAIN) driver supporting network connection is used for reading so as to allow reading conditions to be set on an image transmitting apparatus from an information processing apparatus as a transmission destination of image data.

Meanwhile, in recent years, when an image read by an image transmitting apparatus is transmitted to an information processing apparatus, such as a personal computer (PC), the image transmitting apparatus can access the transmission destination apparatus to obtain image reading conditions required thereby.

If the image transmitting apparatus has such a function, the image transmitting apparatus can read an image automatically under conditions suitable for the transmission destination apparatus and then transmit read image data. Therefore, operability of the image transmitting apparatus can be increased.

However, when the image transmitting apparatus obtains the reading conditions from the transmission destination apparatus, the obtained reading conditions may not coincide with the reading conditions already set on the image transmitting apparatus side. In that case, if the image transmitting apparatus cannot appropriately handle this situation, it is impossible to appropriately transmit image data to the transmission destination, thereby posing a problem of impairing convenience of the image transmitting apparatus. Moreover, a control scheme for allowing an appropriate operation to be performed if the conditions do not coincide with each other has not been conventionally known.

SUMMARY OF THE INVENTION

It is an object of the present invention to at least partially solve the problems in the conventional technology.

According to an aspect of the present invention, an image transmitting apparatus includes a reading condition obtaining unit that obtains a first reading condition relating to an image from an external apparatus via a network; a comparing unit that compares the first reading condition obtained by the reading condition obtaining unit and a second reading condition already set in the image transmitting apparatus; a reading condition determining unit that determines, when the comparing unit determines that the first reading condition is different from the second reading condition, which one of the first reading condition and the second reading condition is to be used as a reading condition when selecting an image data to be transmitted to the external device; and an image transmitting unit that transmits an image data that matches with the reading condition determined by the reading condition determining unit to the external apparatus.

According to another aspect of the present invention, a method of controlling an image transmitting apparatus, includes obtaining a first reading condition relating to an image from an external apparatus via a network; comparing the first reading condition and a second reading condition already set in the image transmitting apparatus; determining, when it is determined at the comparing that the first reading condition is different from the second reading condition, which one of the first reading condition and the second reading condition is to be used as a reading condition when selecting an image data to be transmitted to the external device; and transmitting an image data that matches with the reading condition determined at the determining to the external apparatus.

According to another aspect of the present invention, a computer program product causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a functional block diagram of portions associated with setting of reading conditions and image data transmission in the image transmitting apparatus and an information processing apparatus depicted in FIG. 1;

FIG. 3 is a sequence diagram of a first operation example of the image transmitting apparatus and the information processing apparatus depicted in FIG. 1;

FIG. 7 is a flowchart of another example of the process of FIG. 6;

DETAILED DESCRIPTION OF THE PREFERRED EMBODIMENTS

Exemplary embodiments of the present invention are explained in detail below while referring to accompanying drawings.

Figure 1:
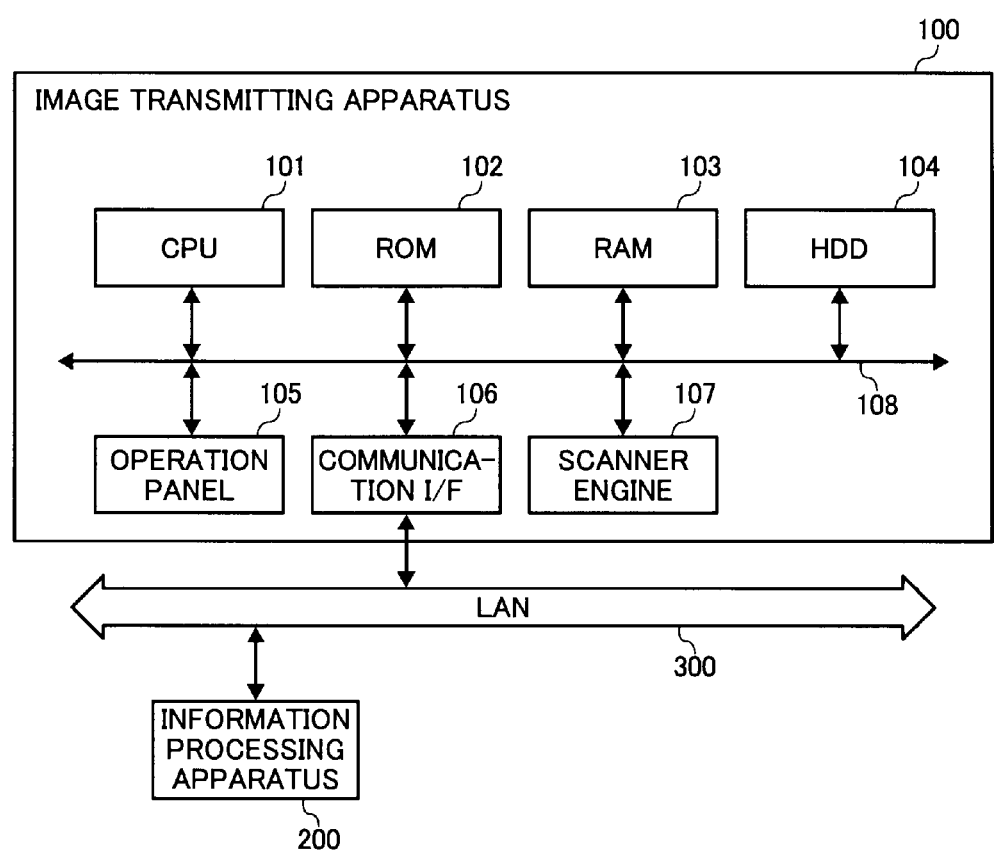
FIG. 1 is a block diagram of a hardware configuration of an image transmitting apparatus according to one embodiment.

First, a hardware configuration of an image transmitting apparatus according to one embodiment is depicted in FIG. 1.

As depicted in the drawing, an image transmitting apparatus 100 includes a central processing unit (CPU) 101, a read-only memory (ROM) 102, a random access memory (RAM) 103, a hard disk drive (HDD) 104, an operation panel 105, a communication interface (I/F) 106, and a scanner engine 107, and these components are connected via a system bus 108.

Of these components, the CPU 101 is a controlling unit that controls over the entire image transmitting apparatus 100. With execution of various programs recorded on the ROM 102 and HDD 104, the CPU 101 functions as a reading condition obtaining unit, a comparing unit, a reading condition determining unit, and other units.

The ROM 102 is a non-volatile storage unit, storing programs executed by the CPU 101, fixed parameters, and others. The ROM 102 may be configured as a rewritable storage unit so that data stored therein can be updated.

The RAM 103 is a storage unit that temporarily stores data for use and is used as a work memory for the CPU 101.

The HDD 104 has stored therein various types of data, such as programs to be executed by the CPU 101, parameter values required to be retained even after the apparatus is powered off, and image data read by the scanner engine 107. In place of the HDD 104, another storage unit, such as an optical disk, may be used for the purpose mentioned above.

The operation panel 105 includes a displaying unit, such as a liquid crystal display (LCD) or a light-emitting diode (LED), and an operating unit, such as various keys and buttons or a touch panel laminated on the LCD. The displaying unit has displayed thereon an operation state, settings, a message, a graphical user interface (GUI) for accepting an operation, and others of the image transmitting apparatus 100. The operating unit accepts operations, such as a user's operation instruction and setting instruction to the image transmitting apparatus 100. Here, as a matter of course, the operating unit and the displaying unit do not have to be integrally provided.

The communication I/F 106 is an interface allowing the image transmitting apparatus 100 to communicate with other apparatuses via a communication path and can be, for example, a network interface for connecting to a network, such as a local area network (LAN) 300, for Ethernet (registered trademark) communication. When the image transmitting apparatus 100 communicates with another apparatus, these communication I/F 106 and the CPU 101 function as a communicating unit. Here, the communication I/F 106 is provided according to communication path specifications, a communication protocol for use, and other factors. The communication path may be arbitrary irrespectively of wired or wireless and, as a matter of course, a plurality of communication I/Fs 106 can be provided according to a plurality of types of specifications.

The scanner engine 107 is an image reading unit that reads an image on a document placed on a reading table or fed by an automatic document feeder (ADF) to a reading unit or the like to obtain image data indicating that image. In response to a request from the CPU 101, reading can be performed under reading conditions, such as a specified document size, resolution, gray-scale, and others.

The image transmitting apparatus 100 as explained above is configured as, for example, a network scanner, in which, in response to an operation from a user, an image on a document is read by the scanner engine 107 and image data obtained through reading is transmitted to an external information processing apparatus 200 communicable via the LAN 300. With the image transmitting apparatus 100 and the information processing apparatus 200 configured as explained above, an image processing system can be formed.

When transmitting image data to the information processing apparatus 200, the image transmitting apparatus 100 accesses the information processing apparatus 200 as an image data transmission destination so as to obtain image reading conditions therefrom, thereby performing reading according to the conditions. Also, even when reading conditions set on the image transmitting apparatus 100 side do not coincide with the reading conditions obtained from the transmission destination, an appropriate operation in consideration of the reading conditions can be performed.

As hardware, the information processing apparatus 200 can be configured by a known computer, such as a personal computer (PC) including a CPU, a ROM, a RAM, a HDD, a network I/F.

Although not absolutely necessary, the information processing apparatus 200 can be provided with a function of notifying the image transmitting apparatus 100 of the presence of its own at the time of powered-on so as to mutually recognize the presence with each other and also registering the image transmitting apparatus 100 as a usable network scanner.

Next, the functions included in the image transmitting apparatus 100 and the operations to be performed by the image transmitting apparatus 100 are explained, mainly focusing on portions associated with setting of reading conditions and image data transmission as explained above.

FIG. 2 is a functional block diagram of portions associated with setting of reading conditions and image data transmission in the image transmitting apparatus 100 and an information processing apparatus 200.

As depicted in the drawing, as functional units having functions associated with setting of reading conditions and image data transmission, the image transmitting apparatus 100 includes an image transmission application 110, a panel controlling unit 120, a communication managing unit 131, and a read controlling unit 132. Each of these functions is achieved by the CPU 101 executing appropriate control software.

Of these units, the panel controlling unit 120, the communication managing unit 131, and the read controlling unit 132 are service modules having a function of controlling the operation panel 105, the communication I/F 106, and the scanner engine 107 in FIG. 1, respectively. In response to a request from an application having a control right over these hardware, hardware control is performed, an operation according to the request is performed, and the received or detected data is passed to the application.

More specifically, the panel controlling unit 120 includes an operation accepting unit 121 that detects an operation at an operating unit and causes the operation to be reported to the application having a control right over the operation panel 105, and a display controlling unit 122 that controls a displaying unit and causes the details specified by an application using the operation panel 105 to be displayed. The display controlling unit 122 includes a prohibiting unit 123 that prohibits an operation of the operating unit.

The communication managing unit 131 has a function of transmitting through the communication I/F 106 data requested by the application for transmission to a specified transmission destination, and also has a function of passing data transmitted from an external apparatus to the communication I/F 106 to an application that should process the data, according to destination information attached to the data and the contents of the data.

The read controlling unit 132 has a function of controlling the scanner engine 107 in response to a request from an application having a control right over the scanner engine 107, and causing an image on a document to be read according to specified reading conditions and then passing image data obtained through reading to the application.

On the other hand, the image transmission application 110 is an application for achieving in the image transmitting apparatus 100 a function of reading the image on the document according to a user's instruction for transmission to a specified transmission destination by issuing various request to the service modules, such as the panel controlling unit 120, the communication managing unit 131, and the read controlling unit 132 to cause them to control the hardware. Here, as such an application, only the image transmission application 110 is provided. Alternatively, another application can be provided. For this purpose, an arbitrating unit that arbitrates a request from an application to a service module can be provided.

The image transmission application 110 includes functions of a transmission-side condition storage unit 111, a transmission-destination condition obtaining unit 112, a reading condition comparing unit 113, a reading condition setting unit 114, and a transmission data managing unit 115.

Of these units, the transmission-side condition storage unit 111 has a function of storing reading conditions set through an operation on the operation panel 105 and destination information indicative of a transmission destination of the read image data. The reading conditions stored in this unit are reading conditions set on the image transmitting apparatus 100 side (second reading conditions). The destination information is specified with an Internet protocol (IP) address, for example, and can be set by using an address book not shown, for example. Such information may be set through an access from an external apparatus communicable through a network (or from the information processing apparatus 200) to the image transmitting apparatus 100 by using a web browser or a client software.

The transmission-destination condition obtaining unit 112 is a reading condition obtaining unit. For transmitting image data to an external apparatus, the transmission-destination condition obtaining unit 112 has a function of accessing the external apparatus as a transmission destination through the communication managing unit 131 and obtaining information about reading conditions set in this external apparatus (first reading conditions). Such reading conditions are set on the external apparatus side as reading conditions that should be set in an apparatus that transmits image data at the time of reading the image data for transmission.

The reading condition comparing unit 113 serves as a comparing unit and a reading condition determining unit, and has a function of comparing the reading conditions on the image transmitting apparatus 100 side stored in the transmission-side condition storage unit 111 and the reading condition on the transmission destination apparatus (which is assumed herein to be the information processing apparatus 200) obtained by the transmission-destination condition obtaining unit 112. If these do not coincide with each other, it is determined which reading conditions are to be used as reading conditions of image data for transmission, from among those on the image transmitting apparatus 100 side and those on the information processing apparatus 200 side. This determination is based on priority information included in the reading conditions on the information processing apparatus 200 side and several settings associated with selection criteria set on the image transmitting apparatus 100 side. The reading condition comparing unit 113 also has a function of informing the reading condition setting unit 114 of the determined reading conditions.

Furthermore, depending on the priority or the settings on the image transmitting apparatus 100 described above, the reading condition comparing unit 113 may determine that image data transmission to the information processing apparatus 200 is suspended. In this case, such a determination is reported to the transmission data managing unit 115. Still further, when image reading is performed before obtaining the reading conditions from the information processing apparatus 200 or when reading not requiring obtainment of the reading conditions from the information processing apparatus 200 is performed, the reading conditions on the image transmitting apparatus 100 side are reported to the reading condition setting unit 114.

The reading condition setting unit 114 has a function of setting the read conditions reported from the reading condition comparing unit 113 to cause the image on the document to be read.

The transmission data managing unit 115 includes a transmission suspending unit 114a, and has a function of managing image data and image data transmission suspension notification that are to be transmitted to the information processing apparatus 200 and requesting the communication managing unit 131 for transmission at the time of transmission. The transmission suspending unit 114a suspends image data transmission when the CPU 101 determines that transmission should not be performed. Such a case will be explained further below.

Still further, the information processing apparatus 200 includes, as functional units with functions associated with setting of reading conditions and image data reception, a communication managing unit 201, a storage unit 202, and a reading condition managing unit 203. These functions are achieved by the CPU of the information processing apparatus 200 executing appropriate control software.

The communication managing unit 201 has a function of controlling the communication I/F and managing data communication with an external apparatus including the image transmitting apparatus 100.

The storage unit 202 has a function of controlling storage units, such as the RAM and the HDD, and causing data received from the external apparatus, and generated by the information processing apparatus 200 by itself, data entered by an input device not shown, such as a keyboard, and other data to be stored. The data includes image data, requests, notifications received from the image transmitting apparatus 100 and the reading conditions on the information processing apparatus 200 side.

The reading condition managing unit 203 has a function of managing reading conditions on the information processing apparatus 200 side, that is, conditions defined as conditions to be set at the time of reading image data for transmission from an apparatus that transmits the image data and, when an instruction for setting or changing a condition or priority is provided automatically or through a user's operation, changing the contents stored in the storage unit 202 according to the instruction. The reading condition managing unit 203 also has a function of, when a notification of image data transmission ready is provided from an external apparatus and it is then determined that image data can be received, returning the reading conditions and priority information on the information processing apparatus 200 side to the notification source.

Here, examples of priority information settable to the apparatus that transmits image data are compulsory information (Must) indicating that the use of the reading conditions on the information processing apparatus 200 side is compulsory and arbitrary information (Want) indicating that the use of the reading conditions on the information processing apparatus 200 side is arbitrary. For each set of reading conditions, either one of these pieces of information can be set.

Next, the operation to be performed when the image transmitting apparatus 100 reads image data for transmission to a specified transmission destination (information processing apparatus 200) is explained.

As explained above, at the time of image data transmission, the image transmitting apparatus 100 accesses the information processing apparatus 200 to obtain the reading conditions set at the information processing apparatus 200. Then, if this obtainment is performed before reading image data, reading is performed according to the reading conditions received from the information processing apparatus 200 within a range of the capability of the scanner engine 107. Thus, even without setting reading conditions on the image transmitting apparatus 100 side, image data can be transmitted suitably for the use at the information processing apparatus 200.

In this case, however, the transmission destination apparatus is accessed from the image transmitting apparatus 100 and, after returning the reading conditions in response to the access, continues to monitor image data reception until the image data is transmitted. If no image data is received for a predetermined period of time, the process may be timed out.

For this reason, in consideration of the case where the amount of document is so large that it takes time to read the document, it may be preferable that the image transmitting apparatus 100 read an image in advance and then access the information processing apparatus 200.

In view of this, the operation of the image transmitting apparatus 100 and the information processing apparatus 200 is explained below, in the case where the image transmitting apparatus 100 accesses the information processing apparatus 200 before reading image data and in the case where the image transmitting apparatus 100 accesses the information processing apparatus 200 after reading image data.

A first operation example is performed when the image transmitting apparatus 100 accesses the information processing apparatus 200 after reading an image.

FIG. 3 is a sequence diagram of such an operation example of the image transmitting apparatus 100 and the information processing apparatus 200 in this case.

In this case, the image transmitting apparatus 100 accepts any time through the operation panel 105 the reading conditions and settings of the image data transmission destination (S11). After these are set, upon detection of a read start instruction (S12), the scanner engine 107 is driven under the reading conditions on image transmitting apparatus 100 side accepted at step S11 to read an image on a document to obtain image data (S13). Then, upon completion of reading (S14), a notification indicative of image data transmission ready is transmitted to the information processing apparatus 200 set as a transmission destination (S15).

On the other hand, the information processing apparatus 200 also accepts any time the reading conditions and their priority settings (SX). Upon reception of the notification indicative of image data transmission ready from the image transmitting apparatus 100, as a response, an image data transmission request is issued, and a notification indicative of the reading conditions and their priority set in the information processing apparatus 200 at that time is issued (step S16). In the processes at steps S15 and S16, the CPU 101 functions as a reading condition obtaining unit.

Upon receipt of this notification, the image transmitting apparatus 100 compares the reading conditions on the image transmitting apparatus 100 side and those on the information processing apparatus 200 side, and also refers to the priority of the reading conditions of the information processing apparatus 200, thereby determining the reading conditions to be used at the time of reading image data for transmission (S17). In the process at step S17, the CPU 101 functions as a comparing unit and a reading condition determining unit.

Then, based on the conditions determined at step S17, it is determined whether to transmit the image data read at step S13 (S18). Criteria for this determination will be explained further below. Here, even if the conditions determined at step S17 are contradictory to the reading conditions executed at step S13, reading does not have to be performed again.

If it is determined at step S18 to transmit the image data, the image data read at step S13 is transmitted to the information processing apparatus 200 (S19). Upon completion of reception, the information processing apparatus 200 notifies the image transmitting apparatus 100 of reception completed (S20). A series of processing associated with image data transmission now ends. Also, in the process at step S19, the CPU 101 functions as an image transmitting unit.

On the other hand, upon determining at step S18 that the image data should not be transmitted, the image transmitting apparatus 100 does not transmit the image data, and notifies the information processing apparatus 200 of image data transmission suspended (S21). Upon reception of such notification, the information processing apparatus 200 notifies the image transmitting apparatus 100 of suspension acknowledged (S22). In this case, image data transmission may be performed by, for example, adjusting the reading conditions after suspension, or may be terminated from then on, an operation for which is not explained herein.

Figure 4B:
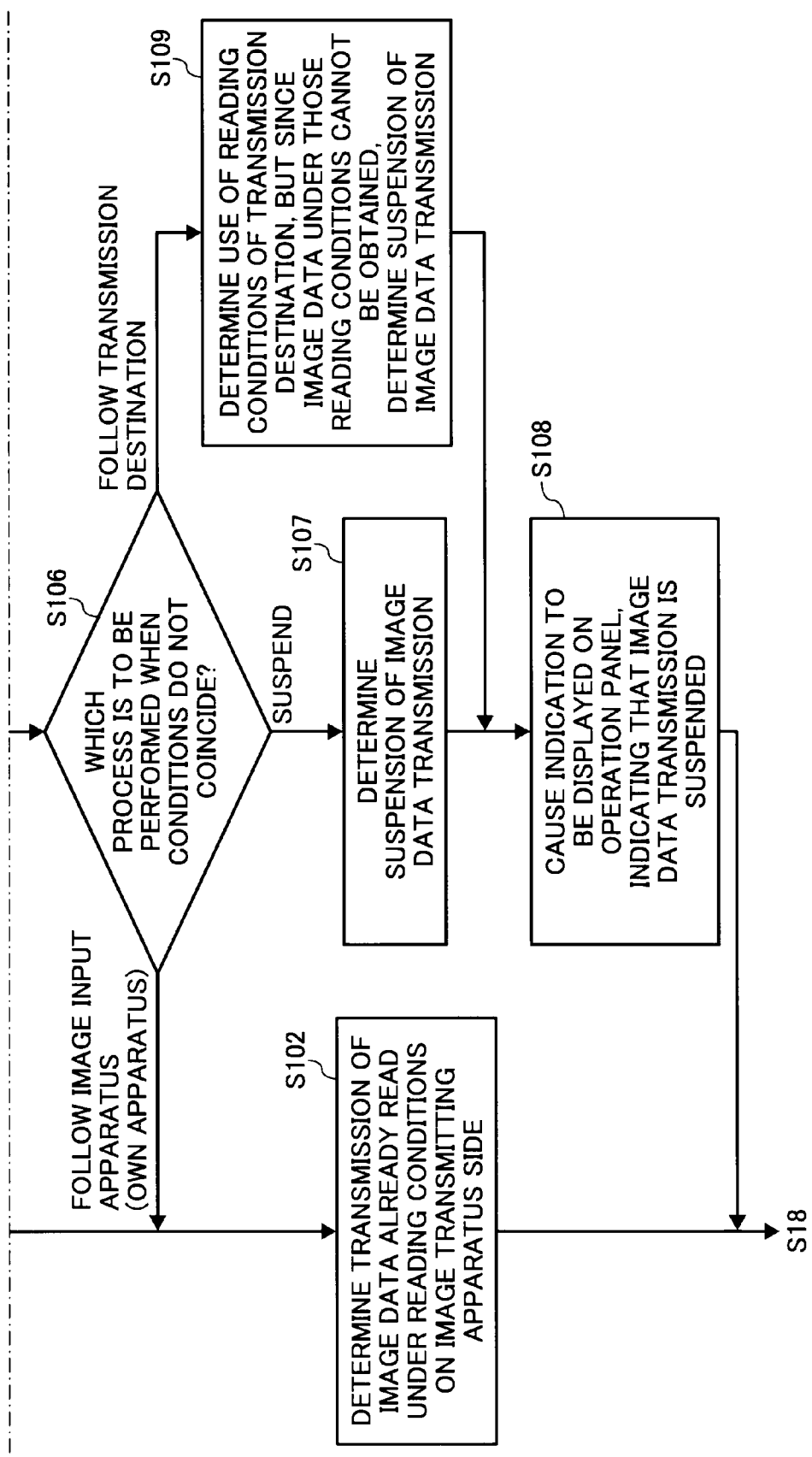
FIG. 4 is a flowchart of a process to be performed by a CPU of the image transmitting apparatus at step S17 of FIG. 3.

FIG. 4 is a flowchart of a process to be performed by the CPU 101 of the image transmitting apparatus 100 at step S17 of FIG. 3.

Upon receiving at step S16 of FIG. 3 the notification of the reading conditions from the external apparatus as the image data transmission destination, the CPU 101 of the image transmitting apparatus 100 starts the process depicted in the flowchart of FIG. 4. Here, the CPU 101 functions as the comparing unit and the reading condition determining unit, thereby performing the procedure depicted in FIG. 4.

First at step S101, priority of the reading conditions of the transmission destination is checked. As explained above, the priority includes "Must" and "Want". Of these, if the priority indicates "Want", it is not necessarily required to follow the reading conditions of the transmission destination. Therefore, the reading conditions on the image transmitting apparatus 100 side can be used. For this reason, transmitting the image data read at the process at step S13 of FIG. 3 poses no problem. Thus, the reading conditions on the image transmitting apparatus 100 side are prioritized. At step S102, it is determined that the image data already read under the reading conditions on the image transmitting apparatus 100 side is to be transmitted (that is, the reading conditions on the image transmitting apparatus 100 side are to be used). Then, the procedure goes to the process at step S18 of FIG. 3, where a determination is made as Yes.

On the other hand, if a determination is made at step S101 as "Must", this means that it is requested from the transmission destination that the reading conditions of the transmission side be always followed. In this case, the procedure goes to step S103. In the process at step S103 and onward, the reading conditions of the transmission destination are used with priority at least more than that of the case of "Want".

At step S103, the reading conditions of the transmission destination are displayed on the operation panel 105 for notifying the user. It is then determined at step S104 whether the reading conditions of the transmission destination coincide with the reading conditions of its own apparatus.

If they coincide, the reading conditions of the transmission destination can also be followed even when using the reading conditions on the image transmitting apparatus 100 side. Therefore, at step S105, an indication that the image data can be transmitted according to the reading conditions of the transmission destination is caused to be displayed on the operation panel 105. It is also determined at step S102 that the image data already read under the reading conditions on the image transmitting apparatus 100 side is to be transmitted. Even in this case, it can be said that the reading conditions of the transmission destination are prioritized and used.

On the other hand, if the conditions do not coincide at step S104, the procedure goes to step S106, where it is determined which process is set to be performed as a process when they do not coincide, from among "follow the image input apparatus (own apparatus)", "suspend", and "follow the transmission destination". This setting may be changed by the user, or may be fixed at the time of shipping from the manufacturer.

If "follow the image input apparatus" is set, it is determined at step S102 that the image data already read under the reading conditions on the image transmitting apparatus 100 side is to be transmitted (that is, the reading conditions on the image transmitting apparatus 100 side are to be used). In this case, the image transmitting apparatus 100 performs an operation different from the operation request by the transmission destination. However, in the case where the image data has already been read in advance, the reading conditions cannot be changed later for re-reading. Therefore, it would be better to transmit even the image data under conditions different from those specified, rather than not transmitting image data at all. In consideration of this, the setting as explained above is possible.

If it is determined at step S106 that "suspend" is set, the procedure goes to step S107, where suspension of image data transmission is determined. Then at step S108, an indication of suspension of transmission is displayed on the operation panel 105 for notifying the user. The procedure then goes to step S18 of FIG. 3. A determination made at step S18 is No.

If it is determined at step S106 that "follow the transmission destination" is set, the procedure goes to step S109, where the use of the reading conditions of the transmission destination is determined. However, document reading has already been completed by using the reading conditions on the image transmitting apparatus 100 side, which are different from the reading conditions of the transmission destination, and re-reading can no longer be performed by changing the reading conditions. Therefore, the image data read according to the reading conditions of the transmission destination cannot be obtained. Thus, as with the case of step S107, suspension of image data transmission is determined, and the procedure then goes to step S108 and onward for the following processes.

At steps S107 and S109, the CPU 101 functions as a transmission suspending unit.

With the processing explained above, even when the reading conditions obtained from the transmission destination apparatus do not coincide with the reading conditions already set in its own apparatus, the image transmitting apparatus 100 can perform an appropriate operation by adjusting both of the reading conditions.

A second operation example is performed when the image transmitting apparatus 100 accesses the information processing apparatus 200 before reading an image.

Figure 5B:
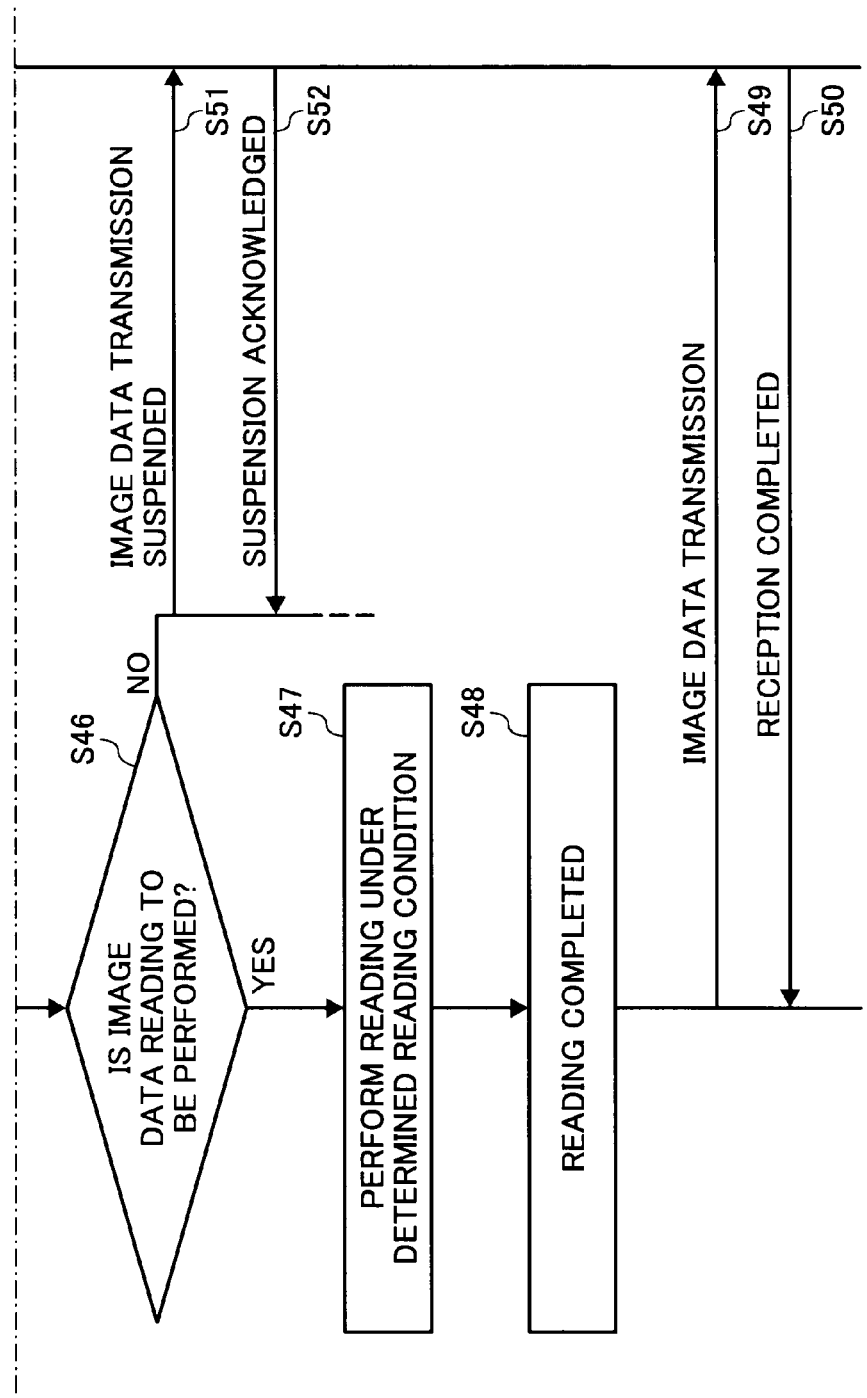
FIG. 5 is a sequence diagram of a second operation example of the image transmitting apparatus and the information processing apparatus depicted in FIG. 1.

FIG. 5 is a sequence diagram of such an operation example of the image transmitting apparatus 100 and the information processing apparatus 200 in this case.

Also in this case, the image transmitting apparatus 100 accepts any time through the operation panel 105 the reading conditions and settings of the image data transmission destination (S41). After these are set, upon detection of a read start instruction (S42), a notification indicative of image data transmission ready is transmitted to the information processing apparatus 200 set as the transmission destination (S43).

On the other hand, the information processing apparatus 200 also accepts any time the reading conditions and their priority settings (SX). Upon reception of the notification indicative of image data transmission ready from the image transmitting apparatus 100, as a response, an image data transmission request is issued, and a notification indicative of the reading conditions and their priority set at that time is issued (step S44). In the processes at steps S43 and S44, the CPU 101 functions as a reading condition obtaining unit.

Upon receipt of this notification, the image transmitting apparatus 100 compares the reading conditions on the image transmitting apparatus 100 side and those on the information processing apparatus 200 side, and also refers to the priority of the reading conditions of the information processing apparatus 200, thereby determining the reading conditions to be used at the time of reading image data for transmission (S45). In the process at step S45, the CPU 101 functions as a comparing unit and a reading condition determining unit.

Then, based on the conditions determined at step S45, it is determined whether to read the image data (S46). Criteria for this determination will be explained further below.

If it is determined at step S45 that reading is to be performed, the scanner engine 107 is driven under the reading conditions determined at step S45 as being used for reading to read an image on a document to obtain image data (S47). Upon completion of reading (S48), the image data is transmitted to the information processing apparatus 200 (S49). Upon completion of reception, the information processing apparatus 200 notifies the image transmitting apparatus 100 of reception completed (S50).

A series of processing associated with image data transmission now ends. Also, in the process at step S49, the CPU 101 functions as an image transmitting unit.

On the other hand, upon determining at step S46 that reading is not to be performed, the image transmitting apparatus 100 does not read image data and, as with steps S21 and S22 of FIG. 3, notifies the information processing apparatus 200 of image data transmission suspended (S51). Upon reception of such notification, the information processing apparatus 200 notifies the image transmitting apparatus 100 of suspension acknowledged (S52).

Figure 6B:
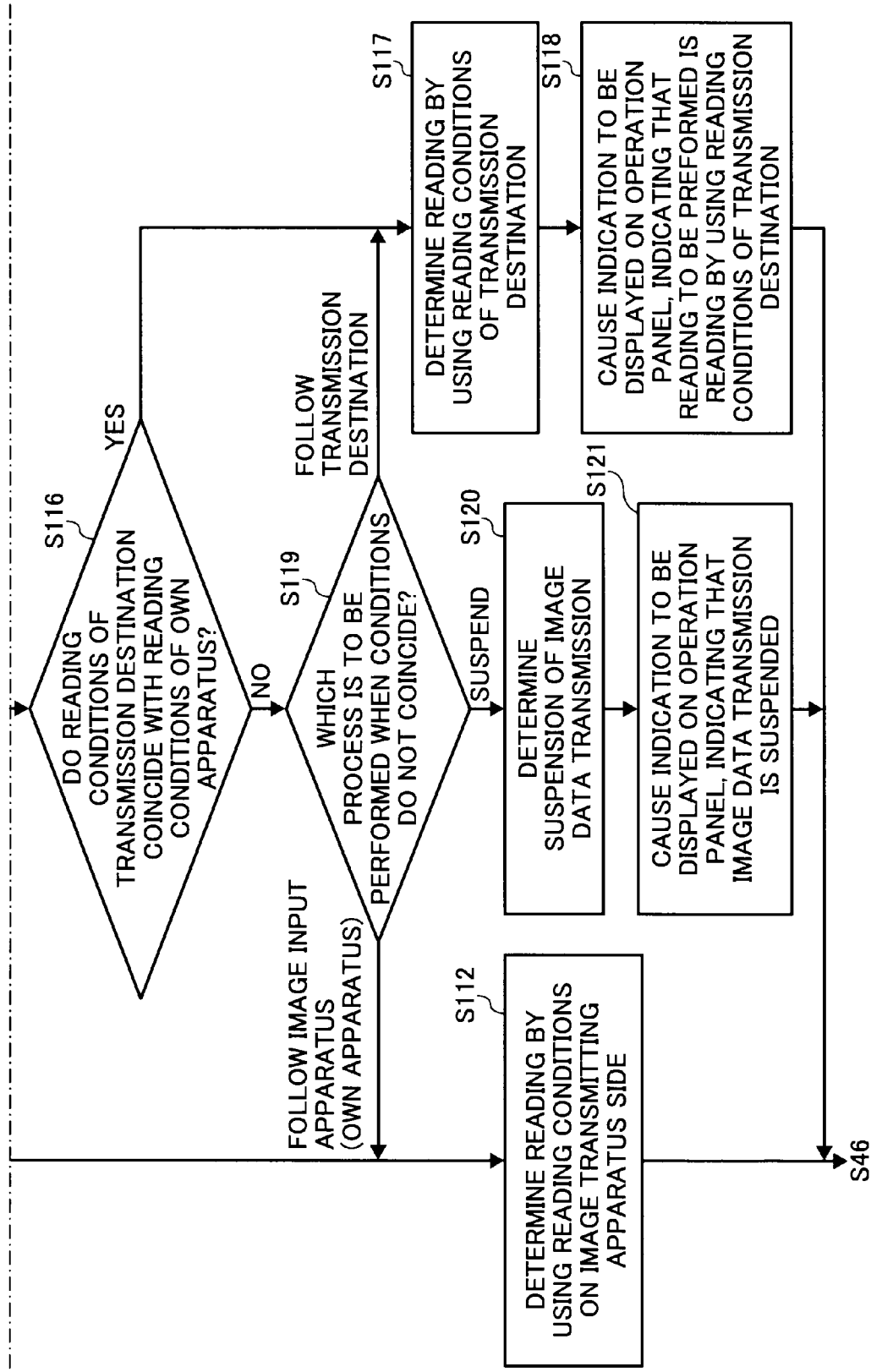
FIG. 6 is a flowchart of a process to be performed by the CPU of the image transmitting apparatus at step S45 of FIG. 5.

FIG. 6 is a flowchart of a process to be performed by the CPU 101 of the image transmitting apparatus 100 at step S45 of FIG. 5.

Upon receiving at step S44 of FIG. 5 the notification of the reading conditions from the external apparatus as the image data transmission destination, the CPU 101 of the image transmitting apparatus 100 starts the process depicted in the flowchart of FIG. 6.

First at step S111, priority of the reading conditions of the transmission destination is checked. As explained above, the priority includes "Must" and "Want". Of these, if the priority indicates "Want", it is not necessarily required to follow the reading conditions of the transmission destination. Therefore, the reading conditions on the image transmitting apparatus 100 side can be used. Thus, the reading conditions on the image transmitting apparatus 100 side are prioritized. The procedure then goes to step S112, where it is determined that reading by using the reading conditions on the image transmitting apparatus 100 side is to be performed. Then, the procedure goes to the process at step S46 of FIG. 5, where a determination is made as Yes, because reading is to be performed.

On the other hand, if a determination is made at step S111 as "Must", this means that it is requested from the transmission destination that the reading conditions of the transmission side be always followed. In this case, the procedure goes to step S113. In the process at step S113 and onward, the reading conditions of the transmission destination are used with priority at least more than that of the case of "Want".

At step S113, it is determined whether change of the reading conditions from the operation panel 105 is set as being prohibited when the priority indicates "Must". If such prohibition is set, at step S114, change of the reading conditions from the operation panel 105 is prohibited, and an indication as such is caused to be displayed on the operation panel 105. The procedure then goes to step S115. If it is determined at step S113 that such prohibition is not set, the procedure directly goes to step S115. In the process at step S114, the CPU 101 functions as a prohibiting unit.

Such setting items and processes as explained above are provided in consideration of the case where a large amount of document that cannot be placed all at once on a placing unit is read by an ADF. That is, in this case, after part of the document is read first, a read wait state may occur until the next document is supplied. In such a state, unless particularly prohibited, the reading conditions can be changed from the operation panel. However, in a state where the reading conditions of the transmission destination must be followed, if the user can freely change the reading conditions in the middle of reading, an inconvenience occurs. Therefore, the reading conditions are prohibited from being changed until the completion of reading. Thus, prohibition at step S114 is preferably automatically removed after the end of reading.

Returning to the explanation of FIG. 6, at the next step S115, the reading conditions of the transmission destination are displayed on the operation panel 105 for notifying the user. Then at step S116, it is determined whether the reading conditions of the transmission destination coincide with the reading conditions of its own apparatus.

If they coincide, either conditions may be adopted for the substantially same result. Thus, adopting the reading conditions of the transmission destination poses no problem. Therefore, the procedure goes to step S117, where, as requested by the transmission destination, the reading conditions of the transmission destination are prioritized, and reading by using the reading conditions of the transmission destination is determined. Then at step S118, an indication is displayed on the operation panel 105 indicating that reading to be performed uses the reading conditions of the transmission destination (follows the reading conditions of the transmission destination), and the procedure then goes to step S46 of FIG. 5. Since reading is to be performed also in this case, a determination made at step S46 is Yes.

On the other hand, when it is determined at step S116 that the conditions do not coincide, the procedure goes to step S119, where it is determined which process is set to be performed as a process when they do not coincide, from among "follow the image input apparatus (own apparatus)", "suspend", and "follow the transmission destination". This setting may be changed by the user, or may be fixed at the time of shipping from the manufacturer. Also, the process setting may be similar to the setting for use for determination at step S104 of FIG. 4, or may be set independently. Independent setting increases user's flexibility more.

If "follow the transmission destination" is set, the procedure goes to step S117, where the reading conditions of the transmission destination are prioritized as requested by the transmission destination to determine that reading using the reading conditions of the transmission destination is to be performed, thereby performing subsequent processing. At this time, if the reading conditions of the transmission destination exceed the capability of the image transmitting apparatus 100, such that color reading is set even though the reading function of the image transmitting apparatus 100 is merely monochrome reading, the reading conditions can be changed so as to be within a range of the capability of the image transmitting apparatus 100.

If it is determined at step S119 that "follow the image input apparatus" is set, the reading conditions on the image transmitting apparatus 100 side are prioritized. The procedure then goes to step S112, where it is determined that reading by using the reading conditions on the image transmitting apparatus 100 side is to be performed. In this case, the image transmitting apparatus 100 performs an operation different from an operation requested by the transmission destination. However, when an operator of the image transmitting apparatus 100 is different from an operator of the information processing apparatus 200, for example, the operator of the image transmitting apparatus 100 may insist on transmitting the image data under the conditions specified by the operator. Therefore, such an operation is allowed herein depending on the settings.

If it is determined at step S119 that "suspend" is set, the procedure goes to step S120, where suspension of image data transmission is determined. Then at step S121, an indication of suspension of transmission is displayed on the operation panel 105 for notifying the user. The procedure then goes to step S46 of FIG. 5. In this case, reading is not to be performed, and therefore a determination made at step S46 is No.

With the processing explained above, even when the reading conditions obtained from the transmission destination apparatus do not coincide with the reading conditions already set in its own apparatus, the image transmitting apparatus 100 can perform an appropriate operation by adjusting both of the reading conditions.

Here, in the process depicted in FIG. 6, when the priority of the reading conditions of the transmission destination indicates "Want", the reading conditions on the image transmitting apparatus 100 side are used. However, in the case of "Want", the reading conditions of the transmission destination can be used, and therefore the reading conditions of the transmission destination may be allowed to be used.

In that case, a process depicted in a flowchart of FIG. 7 can be performed at step S45 of FIG. 5. That is, irrespectively of the priority of the reading conditions of the transmission destination, processes equivalent to step S113 and onward of FIG. 6 can be performed.

Even with the process explained above, the adjusting process performed by the image transmitting apparatus 100 is slightly different from that when performing the processing of FIG. 6. However, even when the reading conditions obtained from the transmission destination apparatus do not coincide with the reading conditions already set in its own apparatus, the image transmitting apparatus 100 can perform an appropriate operation by adjusting both of the reading conditions.

Meanwhile, in the first and second operation examples explained above, in the processes depicted in FIGS. 4 and 6, it is determined at steps S104 and S116 whether the reading conditions of the transmission destination coincide with the reading conditions on the image transmitting apparatus 100 side. However, in the case where an operation is possible by converting the format of the image data even when the conditions do not exactly coincide or the case where the difference is minor and within such an allowable range as negligible, handling similar to that when the conditions coincide may be performed. Modification examples of the first and second operation examples for such cases are now explained below. Here, the range in which similar handling is performed is referred to as a "non-contradictory" range.

Here, the conversion of the format of the image data mentioned above means generation of image data supposed to be obtained under other conditions by removing part of information from the image data obtained through reading under certain conditions, such as by decreasing the number of colors or the number of levels of gray scale, by decreasing resolution, or by narrowing a reading range.

Therefore, for example, if "monochrome" is set as a reading condition of the transmission destination whilst "color" is set as a reading condition on the image transmitting apparatus 100 side, or if "a resolution of 300 dots per inch (dpi)" is set as a reading condition of the transmission destination whilst "a resolution of 600 dpi" is set as a reading condition on the image transmitting apparatus 100 side, it can be said that the reading conditions of the transmission destination are not contradictory to the reading conditions on the image transmitting apparatus 100 side.

On the contrary, however, for example, if "color" is set as a reading condition of the transmission destination whilst "monochrome" is set as a reading condition on the image transmitting apparatus 100 side, or if "a resolution of 600 dpi" is set as a reading condition of the transmission destination whilst "a resolution of 300 dpi" is set as a reading condition on the image transmitting apparatus 100 side, the reading conditions of the transmission destination are contradictory to the reading conditions on the image transmitting apparatus 100 side.

Here, the "non-contradictory range" may be set by the user. Also, format conversion may be actually performed by the image transmitting apparatus 100, the apparatus that receives the image data, or another apparatus. Furthermore, this format conversion may not necessarily be performed in conjunction with reading or transmission and reception of the image data.

Figure 8B:
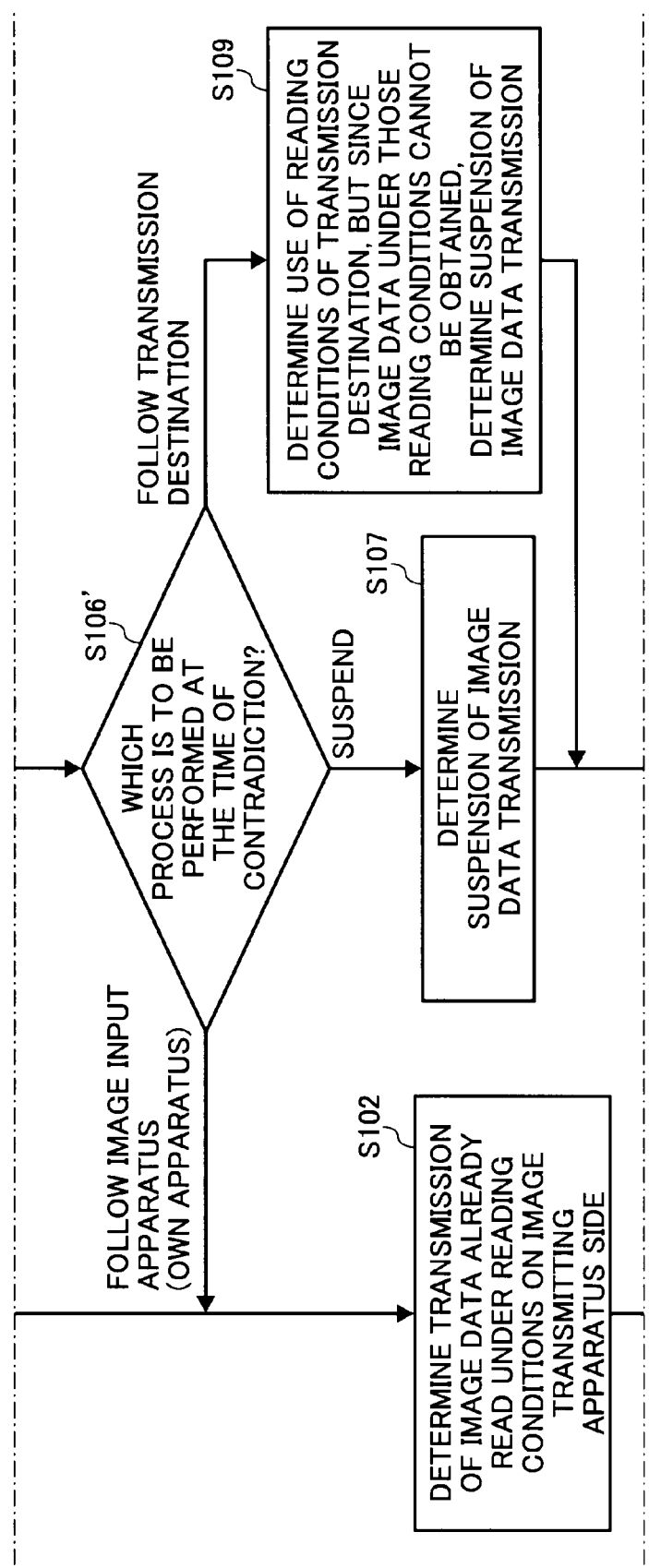
FIG. 8 is a flowchart of another example of the process to be performed by the CPU of the image transmitting apparatus at step S17 of FIG. 3.

FIG. 8 is a flowchart of a process to be performed in the first operation example by the CPU 101 at step S17 of FIG. 3 when the reading conditions of the transmission destination coincide with the reading conditions on the image transmitting apparatus 100 side within the non-contradictory range.

This process corresponds to the process depicted in FIG. 4. Therefore, only a difference from the process depicted in FIG. 4 is explained.

First in the process depicted in FIG. 8, in place of step S104 of FIG. 4, it is determined in step S104' whether the reading conditions of the transmission destination are contradictory to the reading conditions of its own apparatus. If they are not contradictory, it is determined that the reading conditions of the transmission destination can be used, and the procedure then goes to step S105 and onward. If the reading conditions of the transmission destination coincide with the reading conditions of its own apparatus, as a matter of course, they are not contradictory to each other.

After step S105, the procedure goes to step S102. Then, at step S201, it is determined whether change of the format of the image data is required. The reason is as follows. Even though it is determined at step S104' that the conditions are not contradictory, if the reading conditions of the transmission destination do not coincide with the reading conditions on the image transmitting apparatus 100 side, the data format (such as the number of colors, the number of levels of gray scale, resolution, and the number of dots) for the inconsistent item is required to be changed according to the reading conditions of the transmission destination. In this case, a determination made at step S201 is Yes. Then at step S202, the format of the image data is changed, and the procedure then goes to step S18 of FIG. 3. Alternatively, no change may be performed here and a request for performing a changing process may be issued to the transmission destination apparatus.

Furthermore, if the reading conditions of the transmission destination coincide with the reading conditions on the image transmitting apparatus 100 side or if the procedure goes from step S101 or step S106' to step S102, it is considered that no change of the format of the image data is required. Therefore, a determination made at step S201 is No, and the procedure then directly goes to step S18 of FIG. 3.

Here, although the process at step S106' is depicted as being different from step S106 of FIG. 4, only what is changed is that a word "not coincide" is changed to a word "contradiction" according to the determination at step S104', and these processes are substantially the same.

In the case of the first operation example, if the reading conditions of the transmission destination are different from the reading conditions on the image transmitting apparatus 100 side, image data that matches with the reading conditions of the transmission destination cannot be transmitted. By contrast, in the case of the modification example, the reading conditions of the transmission destination can be used within the range not contradictory to the reading conditions on the image transmitting apparatus 100 side. Therefore, image data transmission more suitable for the needs of the user of the transmission destination apparatus can be achieved.

Figure 9B:
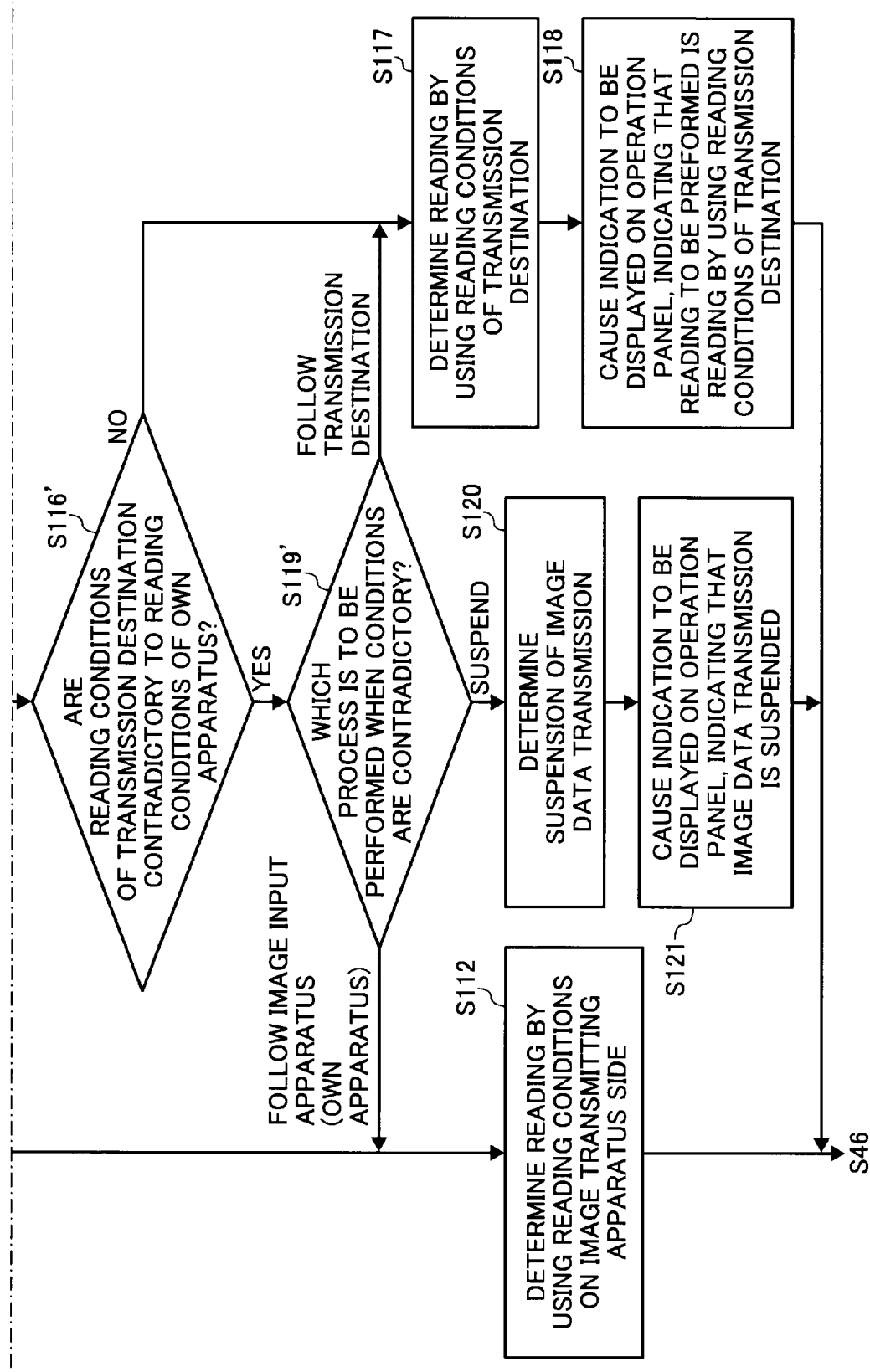
FIG. 9 is a flowchart of another example of the process to be performed by the CPU of the image transmitting apparatus at step S45 of FIG. 5.

FIG. 9 is a flowchart of a process to be performed in the second operation example by the CPU 101 at step S45 of FIG. 5 when the reading conditions of the transmission destination coincide with the reading conditions on the image transmitting apparatus 100 side within the non-contradictory range.

This process corresponds to the process depicted in FIG. 6, and they are approximately identical to each other, except that, at step S116', if the reading conditions of the transmission destination are not contradictory to the reading conditions of its own apparatus, the procedure goes to step S117. Therefore, the procedure goes to step S117 even if the reading conditions of the transmission destination do not necessarily coincide with the reading conditions on the image transmitting apparatus 100 side.

As with the case of step S106' explained above, a process at step S119' is substantially identical to the process at step S119.

With such processes as explained above, also in the second operation example, the reading conditions of the transmission destination can be used in a wider range, thereby allowing image data transmission more suitable for the needs of the user of the transmission destination apparatus. Also, although not explained in detail, in the processes depicted in FIG. 7, by replacing steps S116 and S119 with processes equivalent to steps S116' and S119' of FIG. 9, a similar modification can be provided.

Of the first and second operation examples, which operation is to be performed by the image transmitting apparatus 100, that is, whether the image transmitting apparatus 100 is caused to access the image data transmission destination before or after reading an image, may be freely selected by the user by changing the settings. Alternatively, only one of these operations may be provided. The same goes irrespectively of adopting a modification example.

At any rate, with at least either one of these operations examples being performed, even if the reading conditions of the transmission destination differ from the reading conditions on the image transmitting apparatus 100 side, it is possible to cause the image transmitting apparatus 100 to transmit image data according to either one of the reading conditions.

Furthermore, when priority information is provided to the reading conditions of the transmission destination, which one set of the reading conditions is used is determined based on such priority information. Therefore, appropriate selection of reading conditions can be achieved.

At this time, the reading conditions of the transmission destination are used when the priority indicates "Must". With this, the operation according to the intention of the image transmitting apparatus 100 side can be achieved. Also, the reading conditions on the image transmitting apparatus 100 side are used when the priority indicates "Want". With this, an operation that is easy to use for the operator of the image transmitting apparatus 100 can be achieved.

Still further, in the second operation example, when the reading conditions of the transmission destination are used, the setting operation of the reading conditions on the image transmitting apparatus 100 side is prohibited. With this, the setting is prevented from being changed in the middle of the processing to cause confusion in the operation, thereby increasing usability. Here, in view of this, the processes at steps S113 and S114 of FIG. 6 may be performed after step S118. Still further, when the setting operation is prohibited, an indication as such is displayed on the operation panel 105. With this, the operator can easily recognize the reason why the operation cannot be performed, thereby further increasing usability.

Still further, in the first operation example, in the state where image data reading has already been completed, when the reading conditions of the transmission destination that are different from (or contradictory to) the reading conditions at the time of reading are required to be used, image data transmission is suspended. With this, a situation can be avoided such that image data not suitable for the request of the operator of the transmission destination apparatus is transmitted to cause an inconvenience to the operation of the transmission destination apparatus. Furthermore, an indication that the transmission is suspended is displayed on the operation panel 105. With this, the operator can easily recognize the reason why the transmission is suspended, thereby increasing usability.

Still further, in the state where image data reading has already been completed, even when the reading conditions of the transmission destination that are different from (or contradictory to) the reading conditions at the time of reading are required to be used, a setting of transmitting the read image data is also possible. With this, flexibility of the operator can be increased. When the request from the image transmitting apparatus 100 cannot be satisfied in a case such that a setting that is impossible in the image transmitting apparatus 100 is forced by the transmission destination apparatus, if a function of ignoring the request from the transmission destination apparatus is not provided, image data transmission cannot be performed at all to that apparatus. Such an inconvenient situation can be avoided by providing the ignoring function as explained above.

In the embodiments explained in the foregoing, the configuration of the apparatus and system, specific processes, the order of communication, data format, and others are not meant to be restricted to those mentioned in the embodiments explained above.

For example, in the present invention, as a matter of course, the image transmitting apparatus and the image data transmission destination apparatus may not have a one-to-one correspondence. Also, as a matter of course, the transmission destination apparatus is not meant to be restricted to a personal computer.

Also, the image data to be transmitted by the image transmitting apparatus is not meant to be restricted to data obtained by reading a document at the time of transmission, but may be data read in advance or obtained from another apparatus and then stored in an HDD or the like, as long as the reading conditions of the data can be known. Also, the image data may be image data obtained through a measure other than document reading, such as shooting with a camera.

Furthermore, the present invention may be applied to a data transmitting apparatus that transmits data other than image data. In this case, what is set in the transmitting-side apparatus and the transmission destination apparatus is not restricted to reading conditions, but, more generally, conditions for specifying an environment in which data to be transmitted is obtained.

Still further, the program according to the present invention is a program for causing a computer to control hardware for functioning as an image transmitting apparatus as explained above. The program may be stored in advance in a ROM, an HDD, or the like. Also, a similar effect can be achieved by providing the program as being recorded in a non-volatile recoding medium (memory), such as a compact-disk read-only memory (CD-ROM) or a flexible disk, and then being read by a RAM from the memory for execution by the CPU, or being downloaded from an external device including a recording medium having recorded therein the program or an external device having stored therein the program on a storage unit, such as an HDD, for execution.

The configuration and modification examples explained in the foregoing can be applied in combination as appropriate as long as no contradiction arises.

According to the image transmitting apparatus or image transmitting apparatus control method of the present invention, when a function of obtaining image reading conditions from an external apparatus as an image data transmission destination is provided to the image transmitting apparatus, even if the reading conditions obtained from the transmission destination apparatus do not coincide with the reading conditions already set on the image transmitting apparatus side, an appropriate operation can be performed. Therefore, usability of the image transmitting apparatus can be increased.

Also, according to the program of the present invention, the computer is caused to control the image transmitting apparatus to achieve the features thereof, thereby obtaining similar effects as explained above.

Further effects and modification examples can be derived by the person skilled in the art. The embodiments of the present invention are not meant to be restricted to the specific embodiments as explained above. Therefore, various changes can be made within a range not exceeding the concept of the present invention recited in the attached claims and their equivalents.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image transmitting apparatus, comprising:
   a reading condition obtaining unit that obtains a first reading condition relating to an image from an external apparatus via a network;
   a comparing unit that compares the first reading condition obtained by the reading condition obtaining unit and a second reading condition already set in the image transmitting apparatus;
   a reading condition determining unit that determines, when the comparing unit determines that the first reading condition is different from the second reading condition, which one of the first reading condition and the second reading condition is to be used as a reading condition when selecting an image data to be transmitted to the external device, wherein the first reading condition contains priority information, and the priority information includes compulsory information indicating a setting of the first reading condition is compulsory and arbitrary information indicating that a setting of the first reading condition is arbitrarily requested, and the reading condition determining unit determines that the first reading condition is the reading condition when the compulsory information is included in the first reading condition, and determines that the second reading condition is the reading condition when the arbitrary information is included in the first reading condition; and
   an image transmitting unit that transmits image data that matches with the reading condition determined by the reading condition determining unit to the external apparatus.

2. The image transmitting apparatus according to claim 1, further comprising:
   an operating unit that receives an instruction for setting the second reading condition; and
   a prohibiting unit that prohibits an operation of setting the second reading condition at the operating unit when the reading condition determining unit determines that the first reading condition is the reading condition.

3. The image transmitting apparatus according to claim 1, further comprising a transmission suspending unit that suspends transmission of the image data by the image transmitting unit, in a case where, when the reading condition obtaining unit obtains the first reading condition after the image data to be transmitted has already been read under the second reading condition, the reading condition determining unit determines that the first reading condition is the reading condition and the first reading condition is contradictory to the second reading condition.

4. The image transmitting apparatus according to claim 3, further comprising a display controlling unit that causes, when the transmission suspending unit suspends transmission of the read image data, an indication to be displayed on a displaying unit.

5. The image transmitting apparatus according to claim 1, further comprising a transmission managing unit that causes the image transmitting unit to transmit the image data read under the second reading condition to the external apparatus as the transmission destination even in a case where, when the reading condition obtaining unit obtains the first reading condition after the image data to be transmitted has already been read under the second reading condition, the reading condition determining unit determines that the first reading condition is the reading condition and the first reading condition is contradictory to the second reading condition.

6. A method of controlling an image transmitting apparatus, the method comprising:
   obtaining a first reading condition relating to an image from an external apparatus via a network;
   comparing the first reading condition and a second reading condition already set in the image transmitting apparatus;
   determining, when it is determined in the comparing step that the first reading condition is different from the second reading condition, which one of the first reading condition and the second reading condition is to be used as a reading condition when selecting an image data to be transmitted to the external device; and
   transmitting image data that matches with the reading condition determined in the determining step to the external apparatus,
   wherein the first reading condition contains priority information; and
   the priority information includes compulsory information indicating a setting of the first reading condition is compulsory and arbitrary information indicating that a setting of the first reading condition is arbitrarily requested; and
   the determining step includes determining that the first reading condition is the reading condition when the compulsory information is included in the first reading condition, and determining that the second reading condition is the reading condition when the arbitrary information is included in the first reading condition.

7. The method according to claim 6, further comprising:
   receiving an instruction for setting the second reading condition; and
   prohibiting receiving of the instruction in the receiving step when it is determined in the determining step that the first reading condition is the reading condition.

8. The method according to claim 6, further comprising suspending transmission of the image data at the transmitting, in a case where, when the first reading condition is obtained in the obtaining step after the image data has already been determined in the determining step under the second reading condition, the determining step includes determining that the first reading condition is the reading condition and the first reading condition is contradictory to the second reading condition.

9. The method according to claim 6, further comprising:
   managing the transmitting to transmit the image data read under the second reading condition to the external apparatus as the transmission destination even in a case where, when the first reading condition is obtained in the obtaining step after the image data has already been determined in the determining step under the second reading condition, the determining step includes determining that the first reading condition is the reading condition and the first reading condition is contradictory to the second reading condition.

10. A non-transitory computer-readable medium storing a computer program that causes a computer to implement a method of controlling an image transmitting apparatus, the computer program causing the computer to execute the steps of:

obtaining a first reading condition relating to an image from an external apparatus via a network;

comparing the first reading condition and a second reading condition already set in the image transmitting apparatus;

determining, when it is determined in the comparing step that the first reading condition is different from the second reading condition, which one of the first reading condition and the second reading condition is to be used as a reading condition when selecting an image data to be transmitted to the external device; and transmitting an image data that matches with the reading condition determined in the determining step to the external apparatus, wherein the first reading condition contains priority information;

the priority information includes compulsory information indicating a setting of the first reading condition is compulsory and arbitrary information indicating that a setting of the first reading condition is arbitrarily requested; and the determining step includes determining that the first reading condition is the reading condition when the compulsory information is included in the first reading condition, and determining that the second reading condition is the reading condition when the arbitrary information is included in the first reading condition.

* * * * *